H. WHITING.
COMBINED TYPEWRITING AND COMPUTING MACHINE.
APPLICATION FILED OCT. 2, 1914.
1,329,871.
Patented Feb. 3, 1920.
9 SHEETS—SHEET 5.
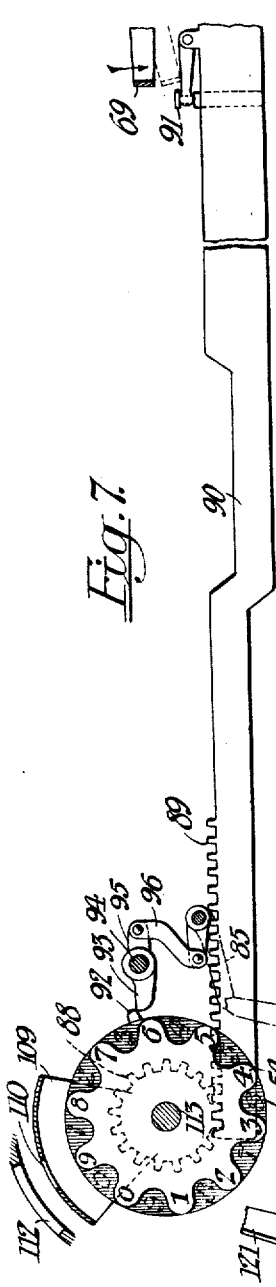
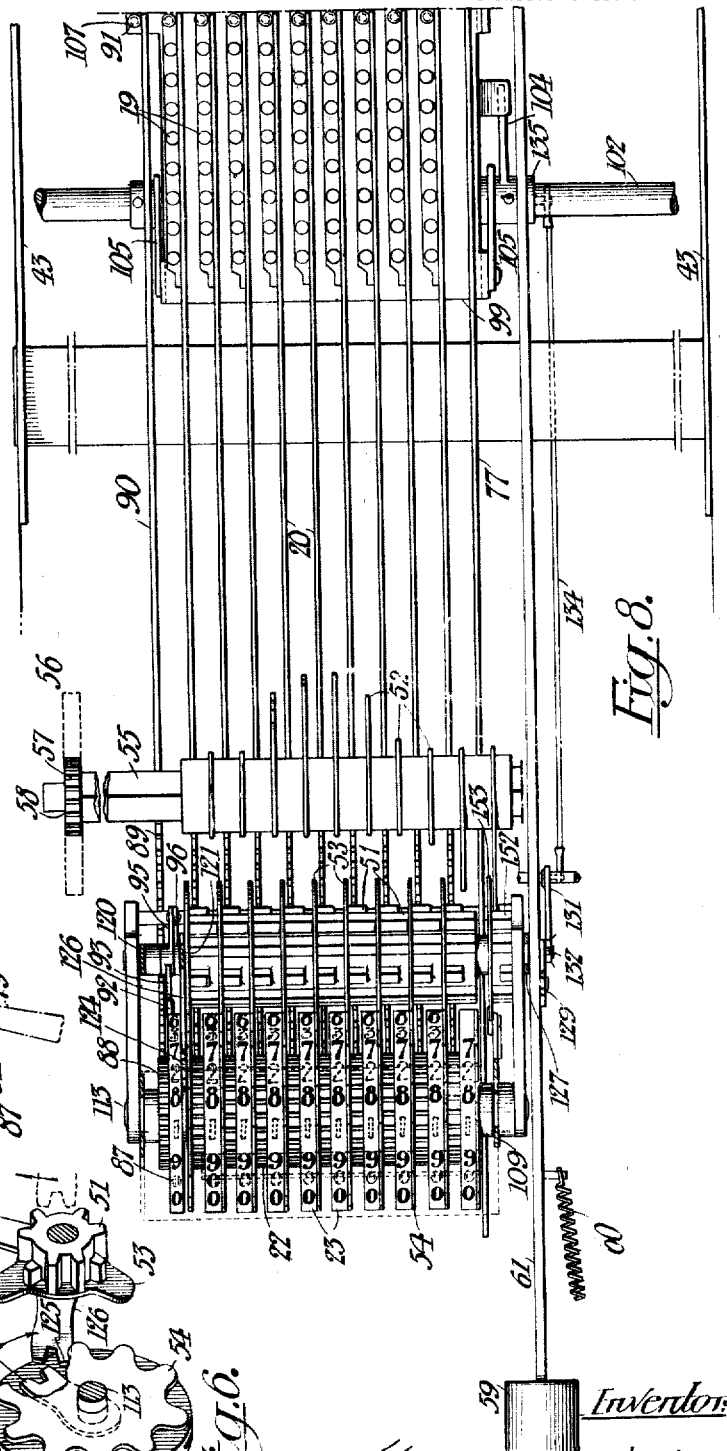

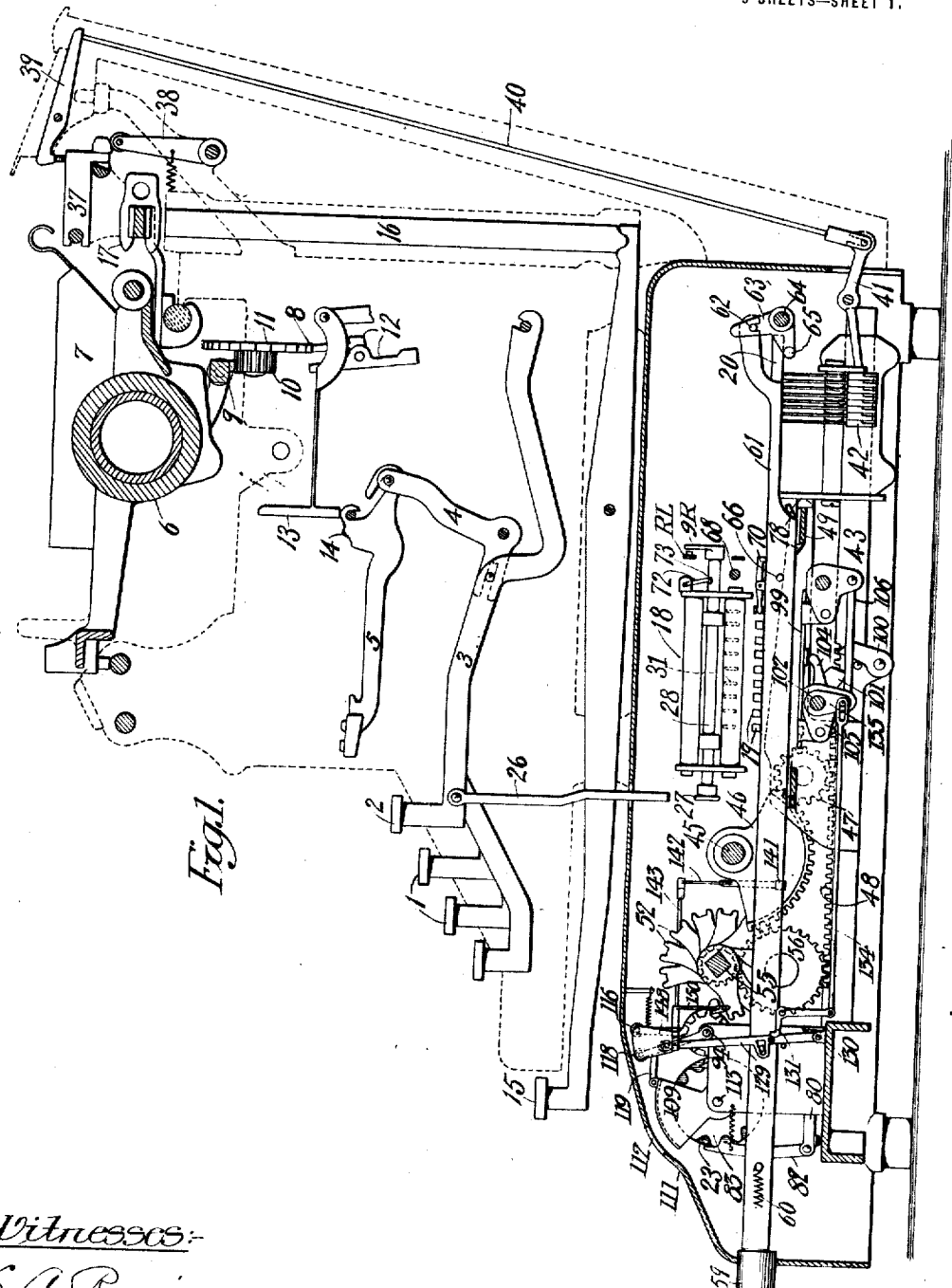

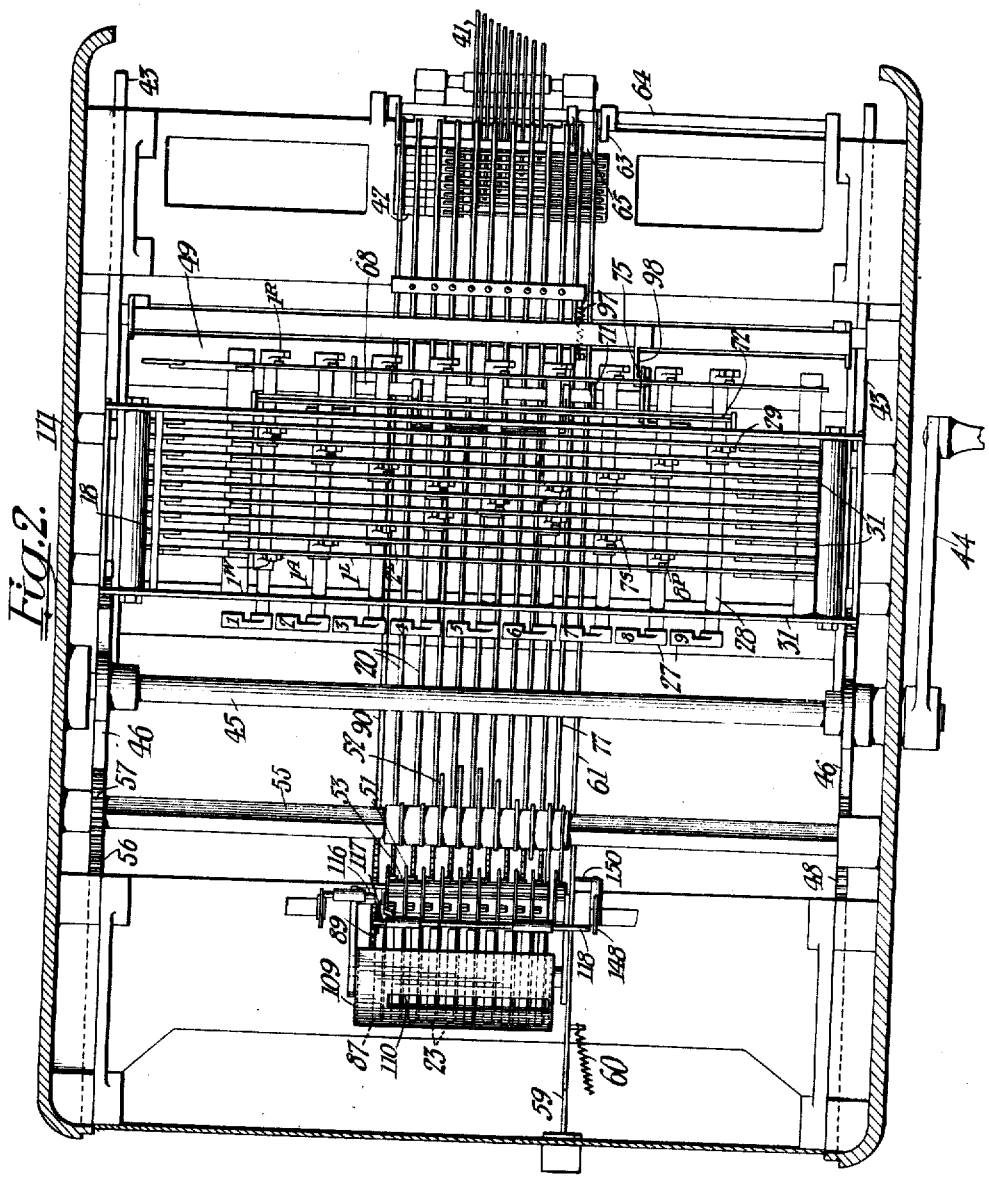

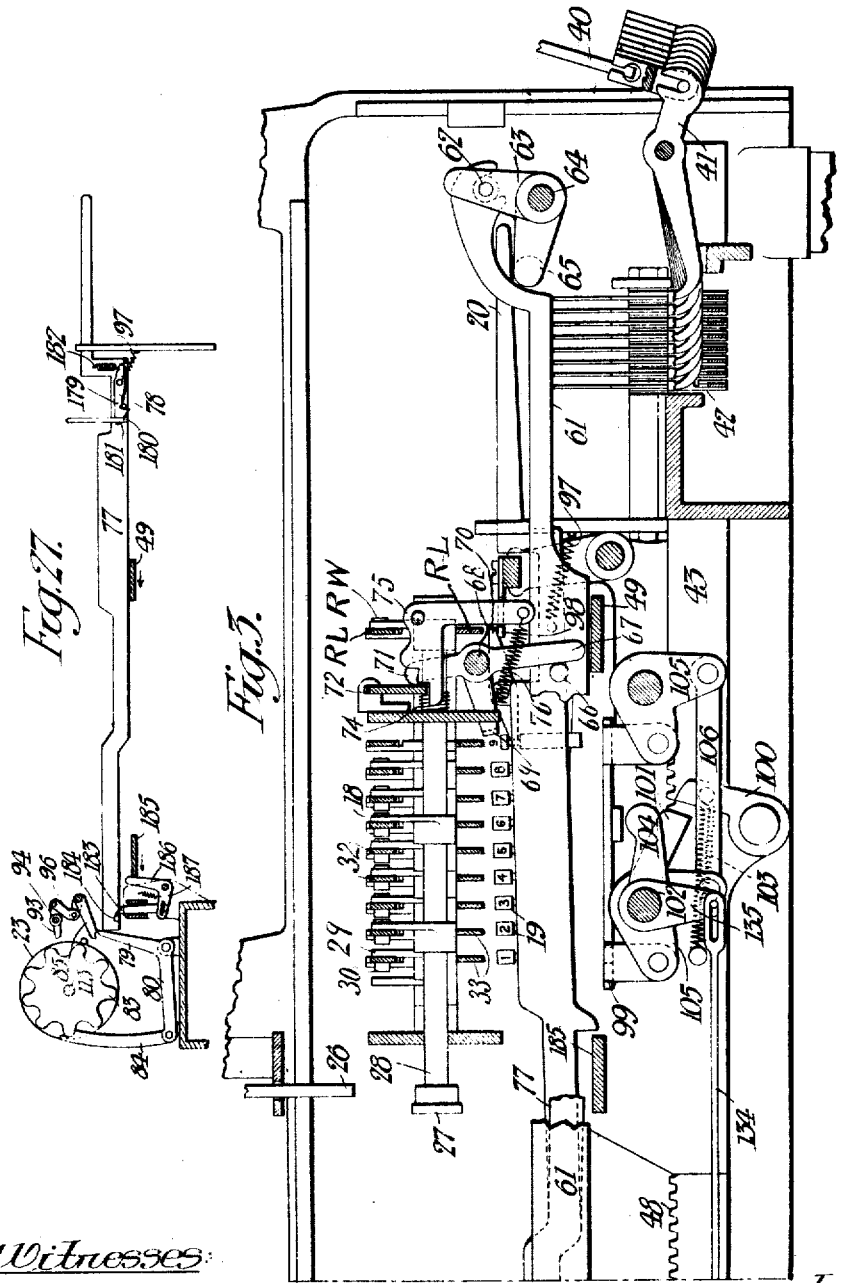

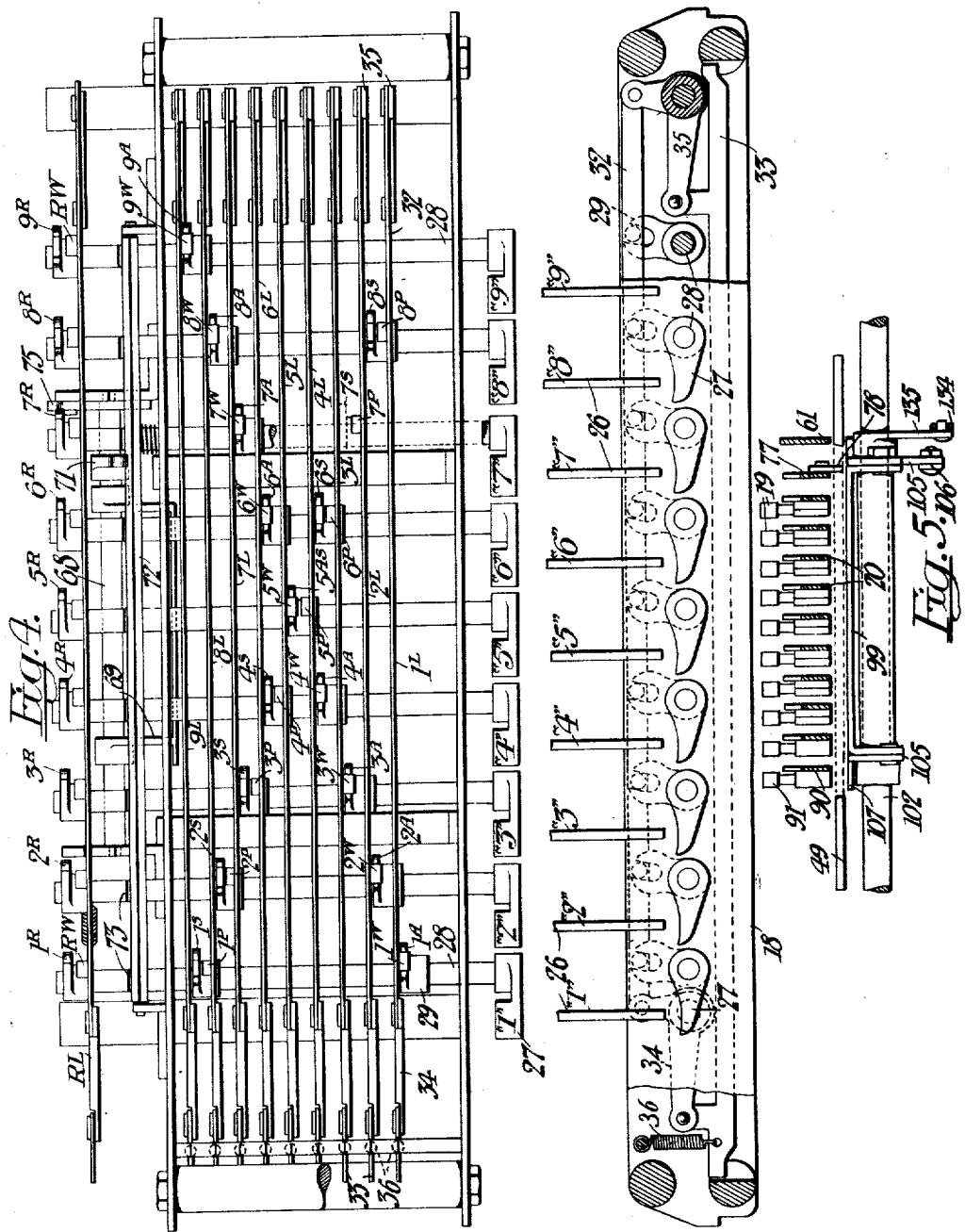

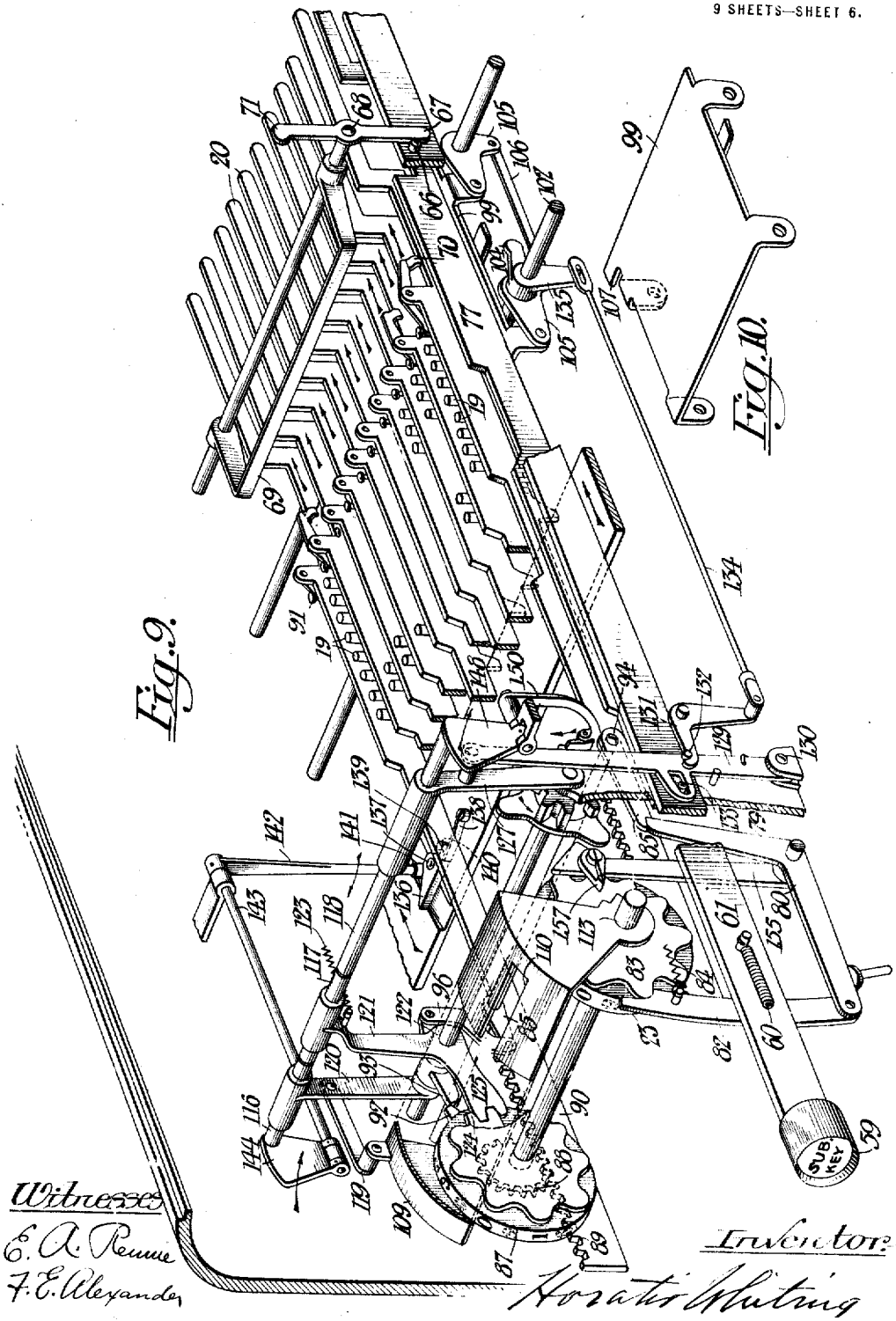

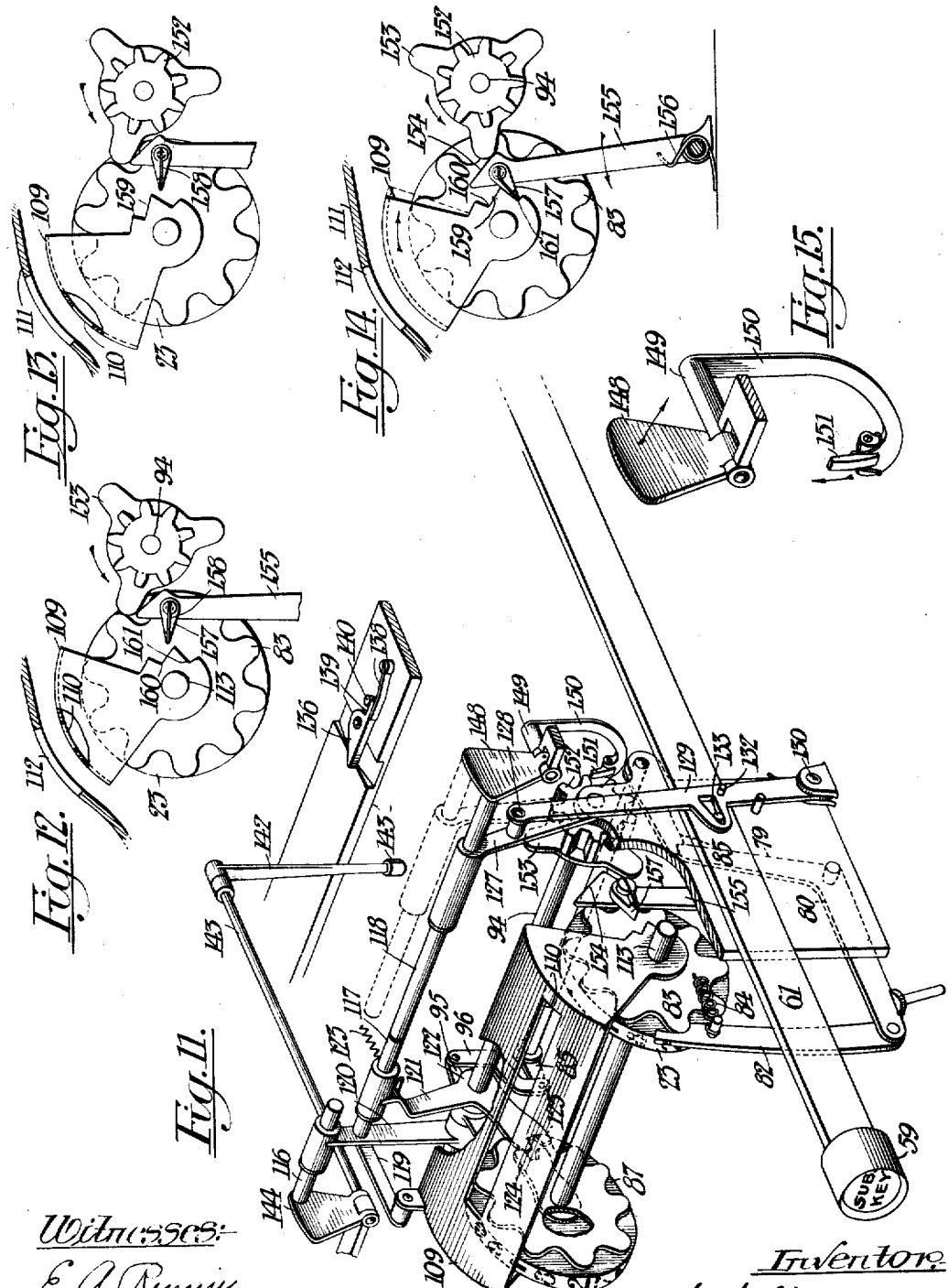

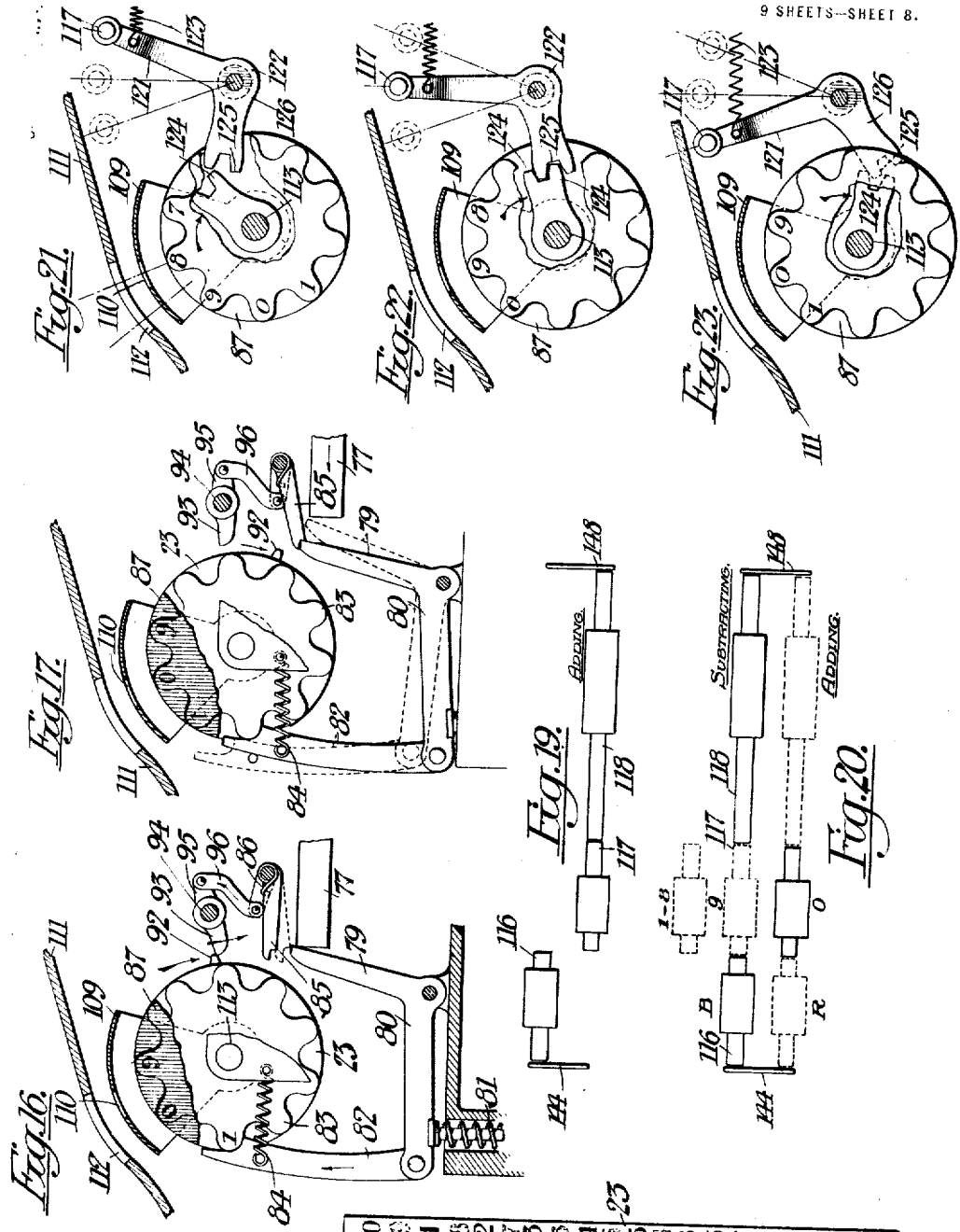

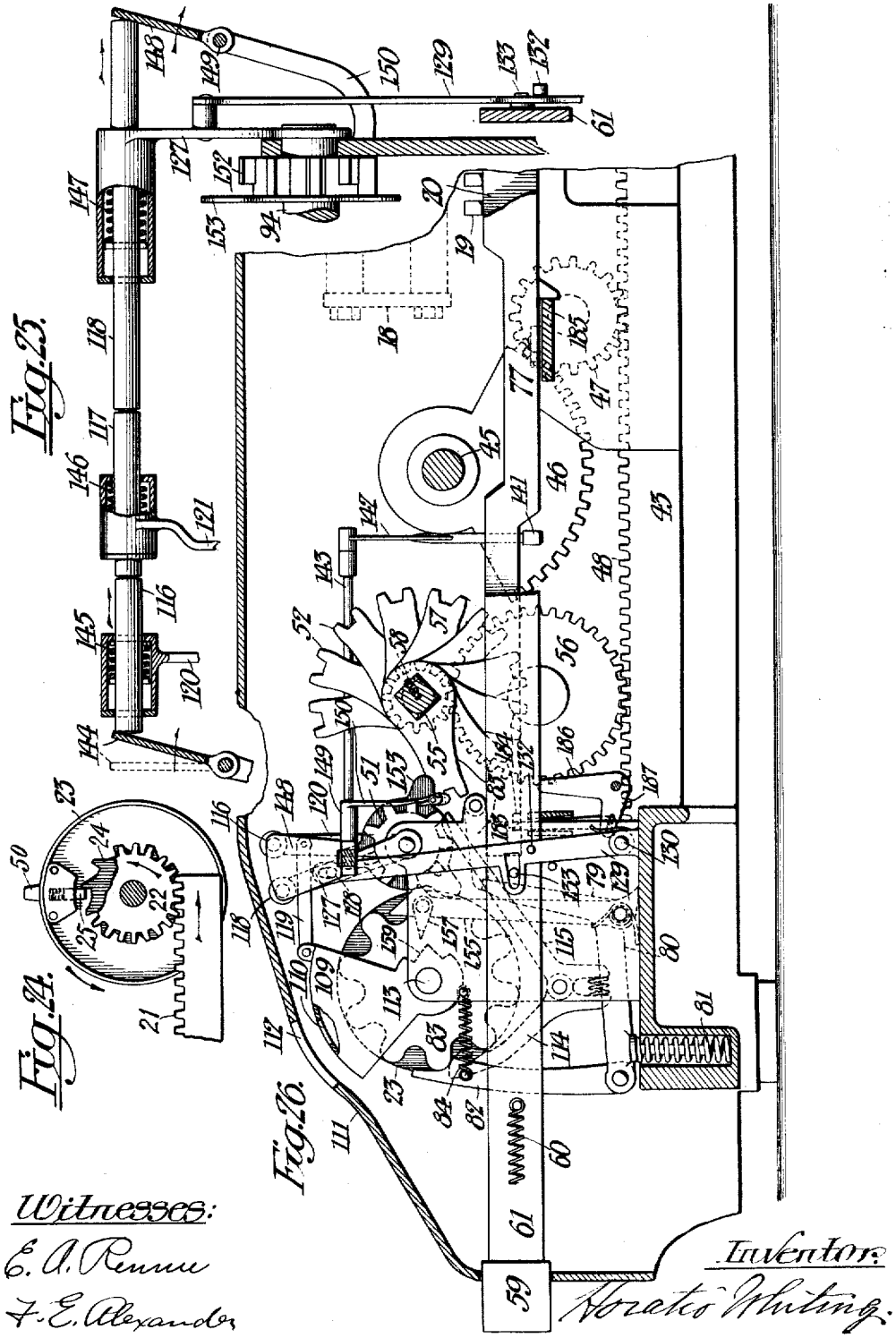

UNITED STATES PATENT OFFICE.

HORATIO WHITING, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPEWRITING AND COMPUTING MACHINE.

1,329,871.  Specification of Letters Patent.  Patented Feb. 3, 1920.

Application filed October 2, 1914. Serial No. 864,592.

*To all whom it may concern:*

Be it known that I, HORATIO WHITING, a citizen of the United States, residing in New York city, in the county of New York and State of New York, have invented certain new and useful Improvements in Combined Typewriting and Computing Machines, of which the following is a specification.

This invention relates to computing machines, more especially to machines adapted to make algebraic summations, and is herein illustrated as an improvement on the type of machine illustrated in the application of Hans Hanson, No. 626,550, filed May 11, 1911, (now Patent No. 1,278,812, dated September 10, 1918).

The object of this invention may be illustrated by an example. If we suppose a depositor in a bank has a balance on hand of say fifty dollars and makes out a check for seventy-five dollars, on cashing this check he has overdrawn his balance the amount of the difference, or twenty-five dollars. Now in the usual method of keeping bank accounts the balance of the depositor is first run into the computing machine as a positive item and then after the deposits have been run into the machine as positive items, if there are any, the amounts of the checks cashed are subtracted from the amount already registered. The machine in which this invention is embodied then will automatically take this larger number, such as the seventy-five dollars, from the smaller positive number, such as the fifty dollars, and give the correct algebraic difference, which is a debit of twenty-five dollars.

It has been attempted to accomplish this result in machines in which the computing wheels are rotated in one direction for addition and in the opposite direction for subtraction. Examples of this are found in my co-pending applications No. 836,693, filed May 6, 1914, and No. 838,513, filed May 14, 1914, (now Patent No. 1,288,333, dated December 17, 1918).

In the present exemplification of the invention a machine of the type disclosed in said Hanson application 626,550 in which the wheels rotate always in the same direction both for addition and subtraction, is used to perform an algebraic summation. That is to say, the present improvement is applied to a machine in which subtraction is done by the complementary method, wherein each computing wheel is rotated a full revolution less the amount of the digit subtracted therefrom, thereby giving in effect a subtracting operation.

In order to effect algebraic summation, the computing wheels (for decimal computing) are provided with two series of numbers ranging from "0" to "9," one of the series preferably being in one color, such as black, and the other series being in another color, such as red, for the purpose of distinction. The two series of numbers ascend in opposite directions around the computing or number wheels, alternating digit for digit with each other. The digits of the two series on a computing wheel are also arranged so that two juxtaposed digits, one from each series, may be paired so as to give the sum of nine. That is to say, the digits are arranged with the complementary digits or co-digits in juxtaposition to each other, so that if a number is exhibited in one series and an algebraic summation has been made, a shift may be effected to disclose the co-digits or complements of the number exhibited.

To effect the change from exhibiting one set of digits, say the black digits, to the other set of digits, say the red digits, and vice versa, there is provided a shutter or shield which is arranged to disclose or indicate but one line of digits at a time, but which may be shifted so as to alternatively disclose either a line of black digits or a line of red digits, indicating respectively that the result of the computation is either a positive or a negative quantity.

In prior inventions along the line of algebraic computing machines the shifting of the shutter or similar indicating mechanism has been predicated on the passing through zero, in a reverse direction to the direction of ascendancy of the numbers exhibited, of the computing wheel of highest denomination when making an algebraic summation, that is, taking a larger number from a smaller number exhibited.

In the present instance the computing wheel of highest denomination never passes through zero in a reverse direction as the computing wheels always rotate in the same direction, and in fact when making an algebraic summation in one direction, that is, in taking a larger negative number from a smaller positive number exhibited, the computing wheel of highest denomination does not even reach zero.

As explained in said Hanson application 626,550, to effect an ordinary complementary subtraction in this type of machine, all the computing wheels not having a number subtracted therein are rotated nine-tenths of a revolution, with the provision of an extra unit added to the units computing wheel so that of necessity tens will be carried, and all the computing wheels of higher denomination than those having digits run in in a subtracting manner, will be rotated a complete revolution, that is ten-tenths of a revolution.

Now then in this type of machine when an algebraic summation is made, that is, a larger negative number subtracted from a smaller positive number exhibited, the complements run into the computing wheels will be so small that tens will not be carried so that the computing wheel of highest denomination will not arrive at "0" but will remain at "9". Therefore one of the conditions denoting an algebraic summation and bringing the mechanism for effecting an algebraic summation into play is predicated on the computing wheel of highest denomination remaining at "9" when subtracting a larger negative number from a smaller positive number. That is to say, when the shift of the shutter should be made from black to red figures, the highest computing wheel will stop short of going to "0" and will remain at "9".

To enable the easy action of the machine and to avoid confusion to the operator, a supplementary computing wheel of highest denomination may be used which may not be a computing wheel and which is only driven when a subtracting operation is taking place, whether an algebraic subtraction or a normal one. This computing wheel of highest denomination is provided with a special rack bar having a single pin corresponding to the "9" pin. This "9" pin is set with the other "9" pins in a manner common to this type of machine when setting the machine for subtraction.

The computing wheel of highest denomination (viz., the supplementary wheel) will always be rotated nine points in subtraction, and if it is an ordinary subtracting operation, "1" will be carried therein so that it will go to zero. If, however, an algebraic subtraction is taking place a carry-over action will not happen so that this highest computing wheel will be left exhibiting "9". Advantage is taken of this state of affairs to enable the shutter to be shifted from showing black positive numbers to showing red negative numbers when the highest computing wheel stops at "9" or at a position corresponding thereto. This means that three conditions must obtain in order to shift the shutter in subtracting a larger negative number from a smaller positive number; that is, the shutter must be showing a black or positive number, the machine must be subtracting, and the highest computing wheel must stop at a position corresponding to the showing of "9".

These three facts are made use of by providing three interponents, one for the shutter, one for the computing wheel of highest denomination, and one for the subtraction-setting mechanism. These three interponents are shifted by their associated parts so that, when the shutter is indicating black numbers, and the highest computing wheel stops at "9" or at a position corresponding thereto as would happen in an algebraic subtraction, with the machine acting to effect a complementary subtraction, then all three of these interponents would be in alinement with each other so that they can transmit an impulse taking place subsequent to the running up of a number and subsequent to the action of the tens-carrying mechanism, which impulse can be used to initiate an action of a shifting mechanism similar to a tens-carrying unit which will shift the shield or shutter from exhibiting black numbers to exhibiting red numbers.

On the other hand when the shutter is in a position corresponding to the showing of red or negative numbers and positive numbers are added thereto, a point will be reached where the added positive number is greater than the negative number exhibited, which will effect an algebraic summation passing through zero in an ascending direction so that it will be necessary to shift from showing red or negative numbers to showing black or positive numbers. To do this three conditions must obtain; that is, the shutter must be indicating red or negative numbers, the highest computing wheel must pass to zero or a position corresponding thereto, and the machine must be adding. The three interponents above mentioned under these circumstances will again occupy a position in alinement with each other, although lying in a different zone than their other position of alinement. They will then permit a transmission of an impulse from the general operator of the computing mechanism which, as before, enables a shifting of the shutter, but this time from showing red or negative numbers to showing black or positive numbers.

The mechanism is so arranged that no matter in which position the shutter is standing, if it moves, it will be shifted to the opposite limit of its throw, that is, if it is showing red, to showing black, or if it is showing black, to showing red, so that the shutter determines by its own position when and how it will be shifted.

In an ordinary complementary subtracting machine it is necessary to insert an extra unit in the units wheel when the computing wheel of highest denomination is to reach zero and not pass through it. Ordinarily this is done without reference to the computing wheel of highest denomination by mechanism entirely distinct therefrom and generally taking place in advance of the movement of the computing wheel of highest denomination, in fact, often causing it to move to zero. In order to obtain a true result in an algebraic summation by a complementary subtracting machine it is necessary to refrain from inserting this extra unit when making an algebraic subtraction in going from a black positive number to a negative red number.

On the other hand in going from a red negative number to a positive black number in ascending through zero while adding, it is necessary to insert an extra unit to the units computing wheel. Inasmuch as the highest computing wheel is an idle computing wheel and only rotates when subtracting or when in adding below zero and "1" is carried thereto from the computing wheel next lower in denomination, advantage is taken of the computing wheel of highest denomination which always rotates in the same direction by causing it in passing from "9" to "0" to trip a special inserting or boosting mechanism which rotates the computing wheel of lowest denomination, that is, gives the units computing wheel an added step. This inserting or boosting mechanism may be normally set for action at any actuation of the general operator of the computing machine so that it will always be ready for action, but it is only tripped into action when the computing wheel of highest denomination passes to zero either in an nonalgebraic subtracting operation or in an adding operation, passing up through zero from an exhibition of a red negative number to the exhibition of a black positive number.

The tens-carrying mechanism in order to complete the computing action, may have a double action during the return stroke of the general operator so that the computing wheel of highest denomination may start the insertion in the computing wheel of lowest denomination, and this action, if necessary, may be later carried to the computing wheels of higher denomination than the units computing wheel.

The interponents receive their impulse, if in alinement, between the first and second actions of the tens-carrying mechanism so that they will have the benefit of the first tens-carrying action to determine whether the summation is an algebraic one or not. Under normal conditions when not effecting an algebraic summation, the interponents are not all in alinement with each other, so that they will not transmit a direct impulse with the result that the shutter will not be shifted from its position but will remain in statu quo.

Other features and advantages will hereinafter appear.

In the accompanying drawings,

Figure 1 is a vertical section from front to rear taken through a Hanson combined typewriting and computing mechanism showing my invention applied thereto.

Fig. 2 is a horizontal section taken above the computing mechanism.

Fig. 3 is an enlarged vertical section of the rear portion of the computing mechanism showing the subtraction-setting mechanism in the very act of setting for subtraction, and before it has returned to a passive position.

Fig. 4 is an enlarged horizontal view partly in section of the pin-setting linkages, showing the arrangement for shifting from an adding setting to a subtraction setting, the linkages being disclosed in their adding setting condition.

Fig. 5 is a view in elevation partly in section, showing the linkages and their manner of superposition above the nest of pins on the denominational members.

Fig. 6 is detail perspective view showing the idle computing wheel of highest denomination with the mechanism thereon for setting the interponent which occupies one of three positions corresponding to the positioning of the computing wheel of highest denomination at an exhibition of "9", "0", or any other digit. The computing wheel of highest denomination and the parts governed are shown as at a point corresponding to the exhibition of "8", with the meshing arms out of engagement with each other, the interponent occupying a passive position.

Fig. 7 is a detail view in vertical section, showing the tooth on the highest computing wheel as about to trip the lock for the inserting or boosting mechanism operating on the units computing wheel. This occurs when the computing wheel of highest denomination passes from a position corresponding to the showing of "9" to a position corresponding to the showing of "0". This view also shows the single pin corresponding to a "9" pin for the idle computing wheel of highest denomination and the means for setting the same.

Fig. 8 is a detail plan view showing the relation of the denominational driving members to the various computing wheels.

Fig. 9 is a skeleton perspective view showing the units computing wheel and the idle computing wheel of highest denomination, together with the three interponents operated individually by the shield, computing wheel of highest denomination, and subtraction key, in which three interponents are shown in alinement with each other corresponding to an exhibition by the shield of black numbers, a positioning of the computing wheel of highest denomination corresponding to the exhibition of "9", and the machine in a subtracting operation after the subtraction key has been actuated. This position of these three interponents in this alinement with each other will only occur when making an algebraic subtraction of a larger negative number from a smaller positive number exhibited in black. The general operator is shown on its return stroke midway thereof about to bring into play the shutter-shifting mechanism through an operation of the three alined interponents.

Fig. 10 is a detail persepective view of the pin-restoring plate which returns the pins to an unset position at the end of a computing operation.

Fig. 11 is a skeleton perspective view showing in full lines the shutter interponent out of alinement with the highest computing wheel interponent and the subtraction or character computation interponent, so that an impulse would not be imparted therethrough. In dotted lines the character computation interponent is shown in its subtracting position, whereas in full lines it is in its adding position.

Fig. 12 is a detail view in elevation partly in section, showing how the shutter-shifting mechanism will shift the shutter from indicating black, as it does in this figure, to indicating red.

Fig. 13 shows how the shutter-shifting mechanism is capable of shifting the shutter from indicating red to indicating black.

Fig. 14 shows the shutter-shifting mechanism in the act of shifting the shutter from indicating red to indicating black, the shutter having not quite completed its movement.

Fig. 15 is a detail perspective view of the starting pawl which brings the shutter-shifting mechanism into play; that is, which shifts the shutter-shifting mechanism to such a position that it will come within the sphere of operation of the tens-carrying assisting shaft.

Fig. 16 is a detail sectional view showing a position successive to that illustrated in Fig. 7 wherein the tens-carrying tooth on the computing wheel of highest denomination, that is, the idle computing wheel, has just tripped the lock for the inserting or boosting mechanism for the units computing wheel as the computing wheel of highest denomination passes from a position corresponding to the exhibiting of a positive "9" to a positive "0."

Fig. 17 shows in dotted lines the inserting or boosting mechanism in the position it would occupy after having rotated the units computing wheel an extra step, and showing in full lines the inserting or boosting mechanism returned to its normal position and locked in such position, the tens-carrying tooth on the computing wheel of highest denomination having cleared the trip for the lock.

Fig. 18 is a developed view of the periphery of a computing wheel showing the relation of the two series of digits thereon which ascend in opposite directions, the heavy numbers indicating the black or positive digits, and the dotted numbers indicating the red or negative digits.

Fig. 19 illustrates the relative positions of the three interponents when adding above zero, that is, in the normal adding operation.

Fig. 20 illustrates all possible positions of the three interponents.

Fig. 21 illustrates the mechanism for shifting the interponent corresponding to the idle computing wheel of highest denomination, and showing the same in a position corresponding to the exhibition of positive "8." This position of the interponent will be the same for the exhibition of any other digit except "9" or "0." Such position will only occur when the computing wheel of highest denomination is rotated.

Fig. 22 illustrates the structure shown in Fig. 21, with the exception that the interponent has been shifted to a position corresponding to the exhibition of "9," which position will occur when making an algebraic subtraction of a larger negative number from a smaller positive number exhibited.

Fig. 23 is a view of the parts shown in Figs. 21 and 22, except that the interponent has been shifted to a position corresponding to the exhibition of a black positive "0", which will occur after all normal adding or subtracting operations above zero and in an adding operation below zero where a larger positive number is added to a smaller negative number, making an algebraic summation.

Fig. 24 is a detail section in elevation showing how the denominational members or rack bars drive the computing wheels solely in one direction.

Fig. 25 is a vertical section showing how the three interponents when in alinement can transmit an impulse to bring into play the shutter-shifting mechanism.

Fig. 26 is an enlarged vertical section taken from front to rear showing the shutter-shifting controlling mechanism and parts of the kicking in or boosting mechanism for the units computing wheel.

Fig. 27 is a vertical section of the priming mechanism for the boosting in mechanism, showing the priming mechanism as just released to permit an operation of the boosting in mechanism at the end of the forward stroke of the general operator.

Alphabet keys 1 and numeral keys 2 depress key levers 3 to rock bell cranks 4 so as to swing type-bars 5 upwardly against the front side of a platen 6 mounted to rotate on a carriage 7. The carriage 7 is advanced step by step by a spring barrel (not shown) under the control of an escapement mechanism indicated in general at 8. This escapement mechanism includes a rack 9 hinged on the carriage 7 so as to be movable into and out of engagement with a pinion 10 connected to an escapement wheel 11 which is controlled by fixed and movable dogs 12. The dogs 12 are in turn controlled by a universal frame 13 which is rocked at the actuation of any one of the type-bars 5 by heels 14 carried thereby. In addition to the step-by-step movements of the carriage the latter may be given jump movements by a tabulating mechanism including keys 15, plunger stops 16 and carriage-carried stops 17.

In addition to operating the type-bars to print the digits the numeral keys 2 operate pin-setting mechanism 18 to set pins 19 on denominational members 20 so as to determine the extent of the movement of the latter. These denominational members 20 are provided at their forward ends with racks 21 (Figs. 9 and 24) so that they form rack bars which engage pinions 22 so as to drive the computing or dial wheels 23. The pinions 22 are however connected to the computing wheels 23 in such a way that the rack bars 21 will only drive the computing wheels on the forward stroke thereof. This is accomplished by a ratchet wheel 24 on each gear 22 engaging effectively, when rotating in a direction indicated by the arrow in Fig. 24, with a spring-pressed pawl 25 on the corresponding computing wheel 23. The rotation of the gear 22 in the opposite direction will permit the pawl 25 to click idly over the ratchet wheel 24 so that the computing wheel 23 will not be disturbed.

To operate the pin-setting mechanism 18, (which may be substantially like that shown in Hanson Patent 816,319, granted March 27, 1906), each numeral key 2 is provided with a thrust link 26 (Figs. 1 and 5) which engages an arm 27 on a rock shaft 28. The rock shafts 28 are provided with arms indicated in general at 29, which engage pins 30 on linkages 31. Each linkage 31 comprises an upper reach 32 and a lower reach 33 connected in parallel spaced relation by bell cranks 34 and 35. The reaches are normally held in close juxtaposition by a spring 36. When the accordant shaft 28 is rocked by its corresponding numeral key 2 the lower reach 33 will be depressed so as to set one of the nest of pins 19. The pins 19 are, however, normally out of reach of the linkages 31 and are only brought a row at a time *seriatim* into the sphere of operation of the same in particular denominational columns. That is to say, each of the denominational members 20 corresponds to a single denomination of writing and is provided, in the case of ordinary computations, with a row of nine pins ranging in value from "1" to "9".

In order to bring each row of nine pins within the range of the pin-setting mechanism 18 there is provided on the carriage 7 of the typewriter a tappet 37 which when the carriage arrives at a computing zone, is raised by a zone-controller 38 to such a position that it will be effective to rock in succession a series of jacks 39. These jacks 39 depress individually thrust rods 40 to rock levers 41. The levers 41 are arranged individually to operate transposition linkages 42 in a manner described in the above mentioned Hanson application. The purpose of these linkages 42 is to raise the rack bars or denominational members 20 one by one, so as to bring the rows of pins 19 individually into the sphere of operation of the pin-setting mechanism 18. Inasmuch as the carriage 7 proceeds from right to left, and the computing must proceed from left to right, the transposition linkages 42 invert the order of actuation so that the jacks 39 which are operated successively from right to left, will raise the denominational members 20 in succession from left to right.

When a series of pins 19 have been set in the manner described above so as to give a preliminary representation of a computation to be run into the series of computing wheels 23, these pins which project below their fellows and below the denominational rack bars 20 serve as a means for determining the extents of movement of the rack bars 20 and in amounts corresponding to the particular pins set. To accomplish this movement there is provided a general operator indicated in general at 43. This general operator may be actuated in any suitable manner either by a motor or by a hand crank 44, secured to a shaft 45 which has one or more segments 46 meshing with pinions 47 driving racks 48 on the sides of the general operator 43. When the hand crank 44 is swung forward it will move the general operator 43 forward so as to bring a cross bar 49 on the general operator into engagement with such of the pins 19 as have been set below their fellows, carrying these pins and the rack bars on which they are mounted forward to rotate the computing wheels 23 a corresponding amount.

If a number has been previously run into the computing wheels 23, some of them may complete a revolution so that it is necessary to carry from a lower computing wheel to a higher computing wheel. For this purpose each of the computing wheels 23 is provided with a tens-carrying or starting tooth 50 (Fig. 24) which once in each revolution engages a mutilated gear 51 so as to shift the same slightly, that is, one-ninth of a revolution. Each of these mutilated gears 51 has every third tooth cut away so as to offer under non-tens-carrying conditions a blank surface to an associated one of a series of segments 52. The segments 52 will normally sweep idly through the blank portions of the mutilated gears 51 without any action. If, however, a tens-carrying tooth 50 has shifted a mutilated gear 51 to bring a full tooth in the range of the associated segment, then this segment will drive the mutilated gear a further distance of two-ninths of a revolution, making a third of a revolution in all.

The mutilated gear (see Fig. 26) in each instance has a three-toothed or trident gear 53 secured thereto and normally out of mesh with a gear 54 on the next higher computing wheel but adapted to mesh therewith and drive that wheel. There are ten teeth on each gear 54 so that a movement of the gear 51 when the associated gear 53 moves through one-third of a revolution, will move the gear 54 one tooth or one-tenth of a revolution, thereby carrying tens from a lower computing wheel to a higher computing wheel, this being substantially the carryover shown in the Hanson patent aforesaid.

The assisting segments 52 are spirally mounted on a shaft 55 so that they will come into action successively starting with the segment corresponding to the units computing wheel and proceeding successively to the tens, hundreds, thousands, and so on. This will enable tens to be carried successively from units to tens, from tens to hundreds, from hundreds to thousands, and so on.

The shaft 55 is rotated on the return stroke of the general operator 43 when the crank 44 moves backwardly, as it is desirable to have the tens computing operation take place subsequent to the running up of numbers on the computing wheels by the rack bars 20. The shaft 55 which carries the assisting segments 52 may receive its drive from any suitable source such as the general operator 43. For this purpose an idle gear 56 meshes with one of the racks 48 of the general operator and drives a pinion 57 mounted on the shaft 55. The gear 57, however, is not fixed on the shaft 55 and only rotates the latter during the return stroke of the general operator. To arrange for this action the gear 57 is connectible to the shaft 55 by the usual one-way acting ball and socket clutch 58. This ball and socket clutch permits the gear 57 to rotate idly during the forward stroke of the general operator but connects the gear 57 positively to the shaft 55 during the return stroke of the general operator. The ratio of the gear 56 to the gear 57 and to the rack 48 is such that the shaft 55 will be given two complete revolutions during the return stroke of the general operator so as to give two possible tens-carrying operations for a purpose to be described.

This machine is arranged to take care of subtracting operations as well as adding operations, and it accomplishes them by what is known as the complementary method. This complementary method consists in rotating the computing wheels through complete revolutions less amounts corresponding to the numeral keys actuated in accordant denominations, which is equivalent to rotating the computing wheels backward amounts corresponding to the numeral keys actuated, although the computing wheels are always rotated in the same direction for either addition or subtraction.

In order to adjust the machine for accomplishing a subtracting operation it may be set by any desirable automatic mechanism, or manually by means of a subtraction key 59 (Fig. 1). This subtraction key 59 has many of the connections shown in the Hanson application aforesaid and when depressed rearwardly against the tension of a spring 60, forces rearwardly a subtraction rod 61 (Figs. 1 to 3). The latter engages at 62 with an arm 63 secured to a shaft 64. This shaft 64 is provided with a bail 65 which underlies all of the denominational members or rack bars 20, so as to raise them simultaneously. The purpose of raising the rack bars in this manner is to enable all of the "9" pins to be set thereon. For this purpose the subtraction rod 61 is provided with a pin 66 which engages a lever 67 secured to a shaft 68 on which is secured a bail 69. This bail overlies and engages all of a series of levers 70 which are connected to the "9" pins on each of the bars 20. It will thus be seen by the concomitant action of the bars 20 and the bails 69, that all of the "9" pins will be set. This is done to provide for the rotation of all the computing wheels not having a number run in by a digit subtracted in the accordant denomination.

In addition to so setting all the "9" pins the pin-setting mechanism 18 is adjusted from a condition in which the set pins 19 correspond to the direct values of the numeral keys 2 actuated, to a condition in which the set pins correspond to the co-digital or complementary values of the numeral keys actuated, using nine as a basis in obtaining the complement. That is to say, if the "1" key is struck the complementary pin, which is "8," will be set; if the "2" key is struck the complementary pin, which is "7," will be set; if the "3" key is struck the complementary pin, which is "6," will be set, and so on.

In effecting this readjustment, the shaft 68 (Fig. 3) which was rocked at the rearward movement of the subtraction key rod 61, will swing forward an arm 71 carried thereby, which in turn will rock forward a shift rail 72 pivoted at its upper edge and engaging at its lower edge in a series of alined notches 73 (Fig. 1) provided in the rock shafts 28. This will force the rock shafts 28 forward against the tension of a spring 74 (Fig. 3) in which position they will be locked by a latch 75 engaging the rail 72, this latch being sprung to its work by a spring 76. The readjustment of the rock shafts 28 changes the pin-setting mechanism from a condition in which it sets the pins for addition, to a condition in which it sets the complementary pins for subtraction. In explaining this phase, the rock shafts 28 and their arms 27 are designated (Fig. 4) by the numbers "1," "2," "3," "4," "5," "6," "7," "8," "9," corresponding to the values of the keys which actuate them. The linkages 31 are indicated successively by the numbers $1^L$, $2^L$, $3^L$, $4^L$, $5^L$, $6^L$, $7^L$, $8^L$, $9^L$, corresponding to the values and extents of movement of the pins 19 which they set. Each of the rock shafts 28 is provided with an adding arm indicated respectively by the reference numerals $1^A$, $2^A$, $3^A$, $4^A$, $5^{AS}$, $6^A$, $7^A$, $8^A$, $9^A$, which engage with pins $1^W$, $2^W$, $3^W$, $4^W$, $5^W$, $6^W$, $7^W$, $8^W$, $9^W$, on the links $1^L$, $2^L$, $3^L$, $4^L$, $5^L$, $6^L$, $7^L$, $8^L$, $9^L$, respectively. The rock shafts 28 are also provided with subtracting arms $1^S$, $2^S$, $3^S$, $4^S$, $5^{AS}$, $6^S$, $7^S$, $8^S$, which are arranged to engage respectively with pins $1^P$, $2^P$, $3^P$, $4^P$, $5^P$, $6^P$, $7^P$, $8^P$, on the links $8^L$, $7^L$, $6^L$, $5^L$, $4^L$, $3^L$, $2^L$, $1^L$, respectively.

It will be noted that the adding and subtracting arm $5^{AS}$ for the rock shaft "5" is common to both the adding and subtracting series as it lies between the $5^L$ linkage and the $4^L$ linkage, "5" being the direct value for the "5" key, and "4" being the complementary or co-digital value for the "5" key.

When the rock shafts 28 were shifted en bloc by the actuation of the subtraction key 59, the adding arms $1^A$, $2^A$, $3^A$, $4^A$, $5^{AS}$, $6^A$, $7^A$, $8^A$, $9^A$, were shifted out of engagement with the pins $1^W$, $2^W$, $3^W$, $4^W$, $5^W$, $6^W$, $7^W$, $8^W$, $9^W$, while the subtracting arms $1^S$, $2^S$, $3^S$, $4^S$, $5^{AS}$, $6^S$, $7^S$, $8^S$, were shifted into engagement with the pins $1^P$, $2^P$, $3^P$, $4^P$, $5^P$, $6^P$, $7^P$, $8^P$. This then enabled the numeral keys 2 to actuate the linkages 31 ranging from $1^L$ to $8^L$ so that they would set pins accordant with the complementary or co-digital values of the numeral keys actuated.

When any of the pins from "1" to "8" are set by the striking of a numeral key 2 in a subtracting operation, it is necessary to unset the "9" pin in the same denomination, that is, on the same bar 20. For this purpose the shifting of the rock shafts 28 also brings a series (Fig. 4) of arms $1^R$, $2^R$, $3^R$, $4^R$, $5^R$, $6^R$, $7^R$, $8^R$, $9^R$, on the rock shafts 28 into engagement with a series of pins RW on a pin-restoring linkage RL. This pin-restoring linkage is similar to the other linkages, with the exception that the lower reach overlies the tails of all of the "9" pin levers 70. It will be seen that this pin-restoring linkage will be operated when any of the numeral keys "1" to "9" is actuated in a subtracting computation so that the "9" pin on which ever denominational member 20 happens to be raised will be unset with the setting of another pin in the case of the keys from "1" to "8." There will be no pin set at the striking of the "9" key as the complement of nine is zero.

The setting of the pins in this complementary manner will enable the number to be subtracted from a number already exhibited by rotating all the computing wheels a complete revolution less the values of the keys struck in the denominations corresponding to the several computing wheels. In a direct or non-algebraic subtracting operation, however, provision has to be made for the boosting or inserting of an extra unit to the units computing wheel in order to give a true result. To provide for this there is provided a special or supernumerary bar 77 (Figs. 5 and 8). This supernumerary bar 77 is provided with a pivotally mounted dog 78 (Figs. 1 and 27) which is engaged on its abrupt surface 179 during the initial portion of the forward motion of the general operator by its cross bar 49. The cross bar 49 will carry the supernumerary bar 77 forward until the front end thereof engages and rocks one arm 79 of a bell crank lever 80 so as to compress a spring 81 (Fig. 26). Pivotally connected to the bell crank 80 there is provided a pawl or dog 82 which is yieldingly held in engagement with a ten-toothed gear 83 on the units computing wheel by a spring 84. The supernumerary bar 77 does not travel, however, the full length of stroke of the general operator, but a stationary trip 180 engages a cam surface 181 on the dog 78 and disengages the same from the cross bar 49 against the tension of a spring 182 which normally holds the dog 78 to its work. The bar 77 settles slightly where it is held in its forward position by a spring-pressed latch 183 which engages in back of a pin or projection 184 on the bar 77. This latch 183 is tripped at the completion of the forward movement of the general operator 43 by the return cross bar 185 engaging one arm of a bell crank lever 186 connected by its other arm 187 to the spring-pressed latch 183. This permits a spring 97 to return the bar 77 to its normal position clear of the inserting or boosting in mechanism. The gear 83 corresponds to the tens-carrying gear 54 on the other computing wheels.

When this inserting or boosting in mechanism, including the bell crank 80 and the driving pawl 82, is set in this manner, it is locked in position automatically by a latch 85 engaging the arm 79. The latch is urged to its work by a spring 86 and maintains the same in operation until tripped. It will thus be seen that the inserting mechanism for boosting the units wheel an extra unit if it has been previously sprung, will be automatically reset at any forward operation of the general operator.

The tripping of the latch 85 to its releasing position shown in full lines in Fig. 16, is controlled from the computing wheel of highest denomination as the latter passes from a position corresponding to the exhibition of "9" to the exhibition of "0". In this particular instance a special computing wheel of highest denomination is provided and indicated specifically at 87 (Figs. 6 to 9, 16 and 17). This special computing wheel of highest denomination may be in reality an idle computing wheel and not be used for actual computation. In fact, it may be concealed by the casing or at least be beyond the range of vision, although it may have numbers inscribed on its surface for the purpose of reference and to designate the different positions of the wheel. This idle computing wheel 87 may be provided with a gear 88 (Fig. 7) similar to the gears 22 on the other computing wheels, which meshes with a rack 89 on a rack bar 90 so as to be driven by the latter.

The connection of the gear 88 to the special idle computing wheel 87 is the same as that for the other computing wheels as illustrated in Fig. 24, so that its rack bar 90 will drive it only in one direction. The rack bar 90 is higher in denomination than any of the other rack bars 20, and is provided with but a single pin 91 which is arranged in alinement with the "9" pins on the other rack bars 20. This special pin 91 will be set when the other "9" pins are set for a subtracting operation by the bail 69. Provision is therefore made at every subtracting operation, whether algebraic or non-algebraic, for a nine-tenths rotation of the special idle computing wheel 87 of highest denomination.

In an ordinary subtracting operation, that is, a non-algebraic subtracting operation, tens will be carried in the usual manner by tens-carrying mechanism similar to that for the other computing wheels, to the special computing wheel of highest denomination so that at every normal subtracting operation the computing wheel 87 will be rotated one revolution. Inasmuch as the computing wheel 87 is started at a position corresponding to "0" at the line of sight, it will come around to this same position after a complete revolution. As the computing wheel 87 moves from a position corresponding to "9" to a position corresponding to "0", that is, as indicated in Fig. 16 where it has completed a part of such movement, a special tooth 92 will engage an arm 93 of a tripper which includes a rock shaft 94 on which the arm 93 is secured and a second arm 95 also secured to the rock shaft 94. The arm 95 is connected by a link, arm and rock shaft 96 to the latch 85 so that as the computing wheel 87 passes from "9" to "0", that is from the Fig. 7 position through the Fig. 16 position to the Fig. 17 position, the latch 85 will be tripped to the Fig. 16 position, permitting the spring 81 to act so that the units computing wheel will be advanced one unit by the boosting in or inserting mechanism.

Inasmuch as the carryover of the extra unit necessary to move the highest computing wheel 87 from the "9" position to the "0" position, generally takes place on the return stroke of the general operator and at the end of the first tens-carrying operation, the bar 77 has had time to be moved away by the spring 97 to a position clear of the arm 79 permitting the bell crank 80 to rock. Of course, on the subsequent forward movement of the general operator, the inserting or boosting in mechanism will be reset by its special bar 77, and the tripping mechanism for the latch 85 having been cleared by the starting tooth 92, will permit the latch 85 to once more lock the boosting in or inserting mechanism in its set or primed condition.

In making a complementary subtraction below zero the inserting or boosting mechanism may happen to be tripped on the forward stroke of the general operator. For this reason the supernumerary bar 77 is locked nearly at its forward position so as to prevent a complete action of the inserting or boosting in mechanism. It is, however, not locked in its extreme forward position but settles onto the latch 183 a slight amount sufficient to permit the arm 79 to move beneath the latch 85 so that the latter cannot reengage this arm until after the inserting or boosting in mechanism has acted on the return stroke of the general operator.

In speaking of the exhibition of "9" and "0" or the positions corresponding thereto in connection with the computing wheel 87 of highest denomination, it may be noted that this computing wheel need not have numbers thereon, and the designations given are merely used to distinguish between positions where the computing wheel 87 has made nine-tenths of a revolution and ten-tenths of a revolution.

It has been shown then how in an ordinary subtracting operation the pins 19 are set up according to the complementary values of the numeral keys actuated, and that the special supernumerary bars 77 and 90 are given movements corresponding to one step and nine steps respectively, so as to provide for the inserting of the extra unit to the units computing wheel. On the return stroke the tens-carrying or, in effect, borrowing takes place, and the machine is tripped so as to return to a normal adding condition in the manner described in the Hanson application 626,550 above mentioned. In brief, this latter is accomplished by a tripper 98 engaging one arm of the latch 75 and releasing the shift rail 72, so that the spring 74 will be permitted to act to return the pin-setting mechanism to an adding setting state.

Provision is made for the restoration of all set pins, whether in adding or subtracting, by means of a pin-restoring plate 99. To operate this plate at approximately the end of the return stroke of the general operator 43 there is provided on this general operator a one-way acting dog 100 which may be of the usual type (Fig. 3) and which trips idly by an arm 101 fixed on a shaft 102 during the forward stroke of the general operator. A spring 103, however, returns the dog 100 to an operative position so that during the return stroke of the general operator, it will engage the inclined back surface of the arm 101 and thus rock the shaft 102 to bring a second arm 104 thereon up against the plate 99 so as to slap the latter up against the under side of the pins 19, moving them to their unset position.

The plate 99 is mounted for horizontal movement by a plurality of bell cranks 105 which are pivotally mounted and are connected by one or more links 106 so as to rock in unison. Provision is made on the pin-restoring plate 99, as seen in Fig. 10, for the unsetting of the special pin 91 on the highest denominational rack bar 90, by forming an extension 107 on this plate.

In addition to making simple additions and subtractions with this machine, provision is made whereby either an algebraic subtraction or an algebraic addition may be made. For this purpose each of the active computing or dial wheels 23 is provided with two series of numbers, as illustrated in Fig. 18. These two series of numbers may be distinguished from each other in any suitable way, as by different colors, one series being in black, and the other in red, the black series being indicated at Fig. 18 by heavy lines, and the red series by dotted lines.

It will be noted that the black series, which in this case are taken to indicate positive numbers or credit items, ascend on the computing wheels 23 in such a direction that the normal rotation of the computing wheels by their rack bars, will cause them to advance in successive ascending order, as 1, 2, 3, 4, etc. On the other hand, the red digits on the computing or dial wheels 23 ascend in the opposite direction so that as the computing wheels are rotated, these digits will come into view in a descending direction, as 0, 9, 8, 7, 6, etc. The digits of one series alternate with the digits of the other series, so that two digits, one from one series, and the other from the other series, are in pairs which give the sum of nine. That is to say, every two adjacent digits, one taken from one series, and the other taken from the other series, may be considered to be co-digits or complements of each other. The black or positive digits may be used for computing above zero with a positive or credit balance in the totalizer, while the red or negative digits may be used for computing below zero with a debit balance.

In order to avoid confusion it is desirable to exhibit, or at least indicate only one set of digits at a time. For this purpose there is provided an indicator in the form of a shutter or shield 109 overlying the computing wheels, which has a sight opening or slot 110 (Fig. 9) of sufficient peripheral magnitude to exhibit but a single line of digits on the several computing wheels. The casing 111 of the computing mechanism may be also provided with a sight opening 112 which however may be of sufficient magnitude to disclose one or the other of the lines of digits according to the position of the shutter or shield 109. A shaft 113 loosely supports the computing wheels 23 and also forms a pivotal support for the shield or shutter 109 so that the latter can be shifted from showing black digits to showing red digits, and vice versa.

When computing in positive items above zero, the shutter 109 is located in the position shown in Fig. 12 where it will exhibit black digits. When computing in negative items below zero the shutter 109 will occupy the position shown in Fig. 13 where it will exhibit red digits. The computing wheels 23 always stop at the same points or intervals of one-tenth of a revolution, and the change is made from showing black to showing red digits and vice versa, by a shifting of the shutter or shield 109. The justified or alined position of the computing wheels 23 is assured by spring detents 114 (Fig. 26) individual to all the computing wheels.

These detents coöperate with detents 115 which act on the tens-carrying units to insure the proper stopping positions of the computing wheels 23 and the tens-carrying mechanism.

There are two conditions when it is necessary to shift the shield or shutter 109. The first of these occurs when we have been showing black digits and an algebraic subtraction is made so that it is necessary to show red digits after having passed through zero in order to give the correct algebraic difference. The second instance is where we have been computing below zero and showing red digits and a larger number has been added to a smaller negative unmber exhibited, making an algebraic addition. Then it is necessary in going up through zero to shift from showing red digits to showing black digits. In the present arrangement the shutter is made to govern its own shifting, first by controlling the shifting mechanism for the shutter, and second by controlling the direction of shift by its own position. That is to say, the shutter itself controls when and how it shall be shifted. Coöperation is needed, however, of other elements which by their position or condition determine with the shutter when it shall be shifted.

The other elements which coöperate with the shutter are the computing wheel of highest denomination and the subtraction-setting or state-controlling mechanism. The reason for this is that when the shutter is in a position indicating black or positive numbers and the machine is subtracting, with the subtraction-setting mechanism having been operated, and the computing wheel of highest denomination fails to arrive at a "0" position, then an algebraic subtraction has taken place, and it is necessary to shift the shutter to a position exhibiting the red digits in order to disclose the true result. In order to take care of these three conditions there are provided three interponents (Figs. 9, 11, 19 and 20) indicated at 116, 117 and 118 in the form of resiliently mounted sections of a thrust bar. The interponent 116 may be termed the shutter interponent in that it is controlled from the shutter or shield; the interponent 117 may be called the computing wheel interponent in that it is controlled from the special or idle computing wheel of highest denomination; and the interponent 118 may be called the state-controlling interponent in that it is controlled from the state-controlling or subtraction-setting mechanism. The shutter interponent 116 may occupy one of two positions indicated by the letters B and R in Fig. 20 corresponding to the positions of the shutter 109 exhibiting black and red digits, respectively.

In order that the movements of the shutter 109 may be transmitted to the interponent 116, a link 119 is connected to the shutter at one end, and at the other end to an arm 120 on which the shutter interponent 116 is mounted. The arm 120 is pivotally mounted at its lower end so as to swing back and forth with the back and forth movements of the shutter 109.

The computing wheel interponent 117 has three positions indicated by 1—8, 9, and 0 in Fig. 20. The first of these positions (Fig. 21) the interponent 117 occupies when the computing wheel 87 of highest denomination is rotating with any peripheral point of the wheel in register with the line of sight other than the "9" and "0" points. The middle position (Fig. 22) of the interponent 117 corresponds to the stopping of the idle computing wheel 87 with the "9" point thereof in register with the line of sight. The third position (Fig. 23) corresponds to the computing wheel 87 with the "0" point thereof in register with the line of sight. To control the several positions of the computing wheel interponent 117, it is mounted on an arm 121 of a bell crank 122. This bell crank is mounted for a swinging movement and is held at times by a spring 123 in the 1—8 position of Fig. 20 (see Fig. 21). When, however, the idle computing wheel 87 has been rotated nine-tenths of a revolution, a segmental gear 124 will come into engagement with a corresponding gear 125 on one of the arms 126 of the bell crank 122 so as to swing the computing wheel interponent from the Fig. 21 position to the Fig. 22 position. If tens should be carried to the computing wheel 87 of highest denomination so that this wheel will have rotated for ten-tenths of a revolution, then the "0" point will come to the line of sight, whereby the mutilated gear 124 will pass on one step farther, bringing the interponent 117 to the Fig. 23 position and holding it there against the tension of the spring 123. It will be evident that inasmuch as the highest computing wheel 87 in normal adding operation above zero is at a position corresponding to the 0 position at the line of sight, this Fig. 23 position will be the normal position.

The state-controlling interponent 118 has two positions; that shown in Figs. 11 and 19 corresponding to the mechanism carrying on an adding operation, and that shown in Fig. 9 and in full lines in Fig. 20 corresponding to the machine carrying on a subtracting operation. To obtain these two positions the state-controlling interponent 118 is mounted on a lever 127 which is pivotally mounted for back and forth swinging movements and is pivotally engaged at 128 by a lever 129 pivotally mounted at 130. The lever 129 normally occupies, when the machine is adding, the position indicated in Figs. 11 and 26, but when the subtraction key 59 is operated to set the machine for subtraction, its rod 61 swings the lever 129 from the Figs. 11 and 26 position to the Fig. 9 position. This shifts the interponent 118 to a position corresponding to the subtracting state. The lever 129 and thus the interponent 118 are locked in this position by a latch 131 (Fig. 9) engaging a pin 132 on the lever 129. The reason for this is that the subtraction rod 61 returns to its normal position after setting for subtraction and before the subtracting operation takes place.

Allowance is made (Fig. 9) for this return movement of the subtraction rod and the key 59 by having a pin-and-slot connection 133 between the lever 129 and the subtraction rod 61. The latch 131 may be tripped at the end of a subtracting computation so as to permit the interponent 118 to return to an adding position corresponding to the adding state, which automatically takes effect in the computing mechanism after a subtracting computation, by means of a link 134 which is connected to an arm 135 on the rock shaft 102, which is operated at approximately the end of the return stroke of the general operator 43 in bringing into play the pin-restoring plate 99.

Whenever the three interponents 116, 117 and 118 are in alinement with each other it denotes that an algebraic (viz., crossing zero) summation is taking place, and it is necessary to shift the shutter 109. When the interponents are in alinement in the position shown in Fig. 9, the shutter will be shifted from showing black above zero to showing red below zero. When the three interponents are in their other position of alinement, which would correspond to the lower three positions in Fig. 20, then the shutter will be shifted from showing red digits below zero to showing black digits above zero. This all takes place automatically, the three interponents when in alinement being used to transmit an impulse which starts shutter-shifting mechanism into action. For this purpose there is provided on the general operator 43 a one-way acting camming dog 136 (Fig. 9) which is pivoted at 137 so that it can swing idly against the tension of a spring 138 on the forward movement of the general operator, but on the return stroke of the general operator an extension 139 thereon engages a stop 140 so as to hold this camming dog 136 rigid.

The camming dog 136 will act as a rigid cam on the return stroke of the general operator so that it will cam aside a follower 141 on an arm 142 which is secured to a rock shaft 143. The rock shaft 143 also has secured thereon a widened arm or blade 144 which will engage with the interponent 116 in either position of its adjustment. If the three interponents 116, 117 and 118 are in alinement as in Fig. 9, the rocking of the shaft 143 and the swinging of the blade 144 in this manner will thrust the interponent 116 lengthwise against the tension of its spring 145 (Fig. 25), which in turn will move the interponent 117 against the tension of a similar spring 146 provided therefor, so that the interponent 117 will in turn move in the direction of its length the interponent 118 against the tension of a spring 147.

The interponents 116, 117 and 118 therefore form a sectional thrust rod which will transmit the movement of the blade 144 to a similar blade or widened arm 148 secured to a rock shaft 149 which swings an arm 150 secured thereto. This arm 150 bears a spring-pressed pawl 151 (Figs. 11 and 15), which is arranged to advance a special mutilated gear 152 which is similar to the tens-carrying mutilated gears 51 and is mounted on the same shaft therewith. There is also provided one of the assisting segments 52 for this special mutilated gear 152. As the pawl 151 moves the mutilated gear around one-ninth of a revolution it displaces the mutilated portion thereof which is normally in register with the associated assisting segment 52 and brings a full or complete tooth in register with the path of movement of such segment. This enables the mutilated gear to be rotated two-ninths of a revolution farther, making a third of a revolution in all.

Secured for rotation with the mutilated gear 152 there is provided a trident or three-toothed gear 153 (Figs. 11 to 14) the teeth of which act as cams engaging a cam head 154 on a lever 155, which is normally held by a spring 156 in a position to be engaged by the teeth of the camming gear 153. Pivotally mounted on the lever 155 there is provided a pawl or dog 157 which is normally held in an intermediate position by a spring 158. Arranged in opposition to the pawl or dog 157 on the shield or shutter 109 there is provided a diverting apex 159 the point of which lies on the center line between the pivot of the dog 157 and the pivot of the shield 109. At the roots of the apex 159 there are provided shoulders 160 and 161 with which the dog 157 will engage according to which way the apex diverts it. That is to say, if the shutter 109 is in the position shown in Fig. 12 showing black, the point of the apex 159 will be slightly below the point of the dog 157 so that as the lever 155 is swung forward, the dog 157 will be diverted upwardly by the cam surface on the upper side of the apex 159. This will bring the dog into engagement with the shoulder 160, so that a further movement of the arm 155 will swing the shield or shutter 109 from the position shown in Fig. 12 to the position shown in Fig. 13. On the other hand, if the shutter 109 is in the position shown in Fig. 13 disclosing red digits and the arm or lever 155 is swung forward, the point of the dog 157 will engage below the point of the apex 159 and be diverted by the cam surface on the under side thereof to the position shown in Fig. 14 where it will engage with the shoulder 161, whereby through a further movement of the lever 155, the shutter or shield 109 will be rocked to the right through the position shown in Fig. 14 to the position shown in Fig. 12.

The position of the camming dog 136 on the general operator 43 is such that it will come into play just after the general operator has completed one-half of its return stroke. This enables the initial tens-carrying operation to have been entirely completed, and shifts the special mutilated gear 152 into a position to be operated by the tens-carrying assisting shaft and the segment therefor at the beginning of the second tens-carrying operation, which is provided for by the double rotation of the tens-carrying assisting shaft 55 during the return stroke of the general operator.

The segment 52 which assists the shutter-shifting mechanism is located in advance of the one which assists in the carrying from the units computing wheel to the tens computing wheel, so as to distribute the load on the shaft 55, although it might be located in register with the assisting segment for the units computing wheel, or at any other suitable point.

A shifting mechanism has therefore been provided for the shutter or shield 109 which forms an indicating mechanism to designate the characteristic of the computation, that is whether it is a positive or a negative item.

It has further been shown that the shutter or shield 109 determines by its position when and how it shall be shifted by the shifting mechanism therefor, this being controlled with the coöperation of the highest idle computing wheel and the subtraction-setting or state-controlling mechanism.

In considering the operation of the device a specific sum will be taken and followed through. This sum takes in all possible summations, algebraic and non-algebraic, above and below zero, and is as follows:

$$\begin{array}{r} +54 \\ -23 \\ -68 \\ -25 \\ +45 \\ +65 \end{array}$$

This sum may be performed by cross addition or addition in a vertical column, either operation being feasible and depending upon the particular type of work desired. The movements of the typewriter carriage will therefore not be considered, as being immaterial to the disclosure of the present invention, except as hereinbefore set forth.

With the machine set for adding, the 54 is set up in the pins and run up into the numeral wheels by an actuation of the general operator in the usual manner, so that the shutter 109 will disclose or indicate the following number, provided there are nine active computing wheels and one inactive one, as illustrated in Fig. 8; the number supposedly in position on the inactive computing wheel being double underlined as it merely indicates which one of the ten possible positions of this highest computing wheel is extant:

$$0\ 0\ 0\ 0\ 0\ 0\ 0\ 0\ \underline{5}\ 4$$

Under the conditions of running in this 54, the shutter and its interponent will be in the position shown in Fig. 11; the highest computing wheel and its interponent will be also in the position shown in Fig. 11; and the subtraction-setting mechanism will not have been actuated so that the interponent 118 will also be in the full line position shown in Fig. 11. Under these circumstances the three interponents are not all in alinement with each other so that the return stroke of the general operator will be idle as far as the bringing into play of the shutter-shifting mechanism is concerned, so that the shutter 109 will remain disclosing black digits.

Further, inasmuch as no subtracting operation has taken place, the highest computing wheel 87, which is an idle one, will not have stirred so that the inserting or boosting in mechanism for the units computing wheel will not have been tripped.

We next set the machine for subtraction by an operation of the subtraction key 59 so that we may subtract the 23. In this operation all the "9" pins will be set, including the special "9" pin 91 for the idle computing wheel 87. As the "2" key is struck in the tens column the "7" pin on the corresponding rack bar 20 will be set up and the "9" pin unset. As the "3" key is struck in the units column the "6" pin will be set up on the corresponding rack bar 20 and the "9" pin unset. The general operator is then actuated by pulling forward the handle 44 so that all the computing wheels above the tens computing wheel will be rotated nine-tenths of a revolution, that is, nine steps. The tens computing wheel will be rotated seven steps, the complement of two, and the units computing wheel will be rotated six steps, the complement of three. As the tens computing wheel rotates seven steps in the same direction as this computing wheel was rotated for addition, it will bring this tens computing wheel to such a position that it will pass through the "0" point so as to carry "1" to the hundreds computing wheel which now stands at "9". The hundreds computing wheel in turn will pass to "0" and carry "1" to the thousands computing wheel which stood at "9". The thousands computing wheel will in turn carry "1" to the tens of thousands wheel, and so on throughout the whole line of computing wheels higher than the tens computing wheel, and even to the computing wheel of highest denomination, that is, the idle computing wheel 87.

As the highest computing wheel 87 has made one complete revolution it will pass from the "9" to "0" position (although these numbers need not be exhibited), so that the special tooth 92 thereon will pass through the position shown in Fig. 16 to the position shown in Fig. 17, tripping the latch 85 and thereby permitting an action of the inserting or boosting in mechanism under the propulsion of its spring 81, so that the units computing wheel will be advanced one step in addition to that which it was already advanced, that is, six steps, or seven in all.

Inasmuch as "4" showed before, "1" will show now, and "1" will be carried to the tens computing wheel so that we will have the sum: 54—23=31. The inserting of the extra unit took place between the first and second carryovers so that the carry-over mechanism has had plenty of time to carry "1" from the units computing wheel to the tens computing wheel had it then been necessary. There will be no shifting of the shutter or shield 109 under these circumstances because the three interponents are not in alinement with each other. That is to say, while the interponents 116 and 118 will be in the same line, the interponent 117 will be out of alinement therewith, as indicated in full lines in Fig. 20.

At the end of the computing operation the latch 131, which caught and held the interponent 118 in its subtracting position, is tripped by the pin-restoring plate 99 so that the interponent 118 returns to an adding position.

The next number to be computed in this summation is the —68. The machine is then again set for subtraction, and the "6" key struck in the tens column and the "8" key struck in the units column. This will set up, respectively, the "3" pin and the "1" pin. All the computing wheels above the tens computing wheel will be rotated nine points; the tens computing wheel will be rotated three points, and the units computing wheel will be rotated one point, so that if we were to look at the register at this time there would be disclosed in black digits the following number:

9 9 9 9 9 9 9 9 6 2

There has been therefore no carry to the hundreds computing wheel and thus no carry to the thousands wheel, and so on to the highest computing wheel. This denotes that an algebraic summation has taken place, or in other words, it has been endeavored to subtract a larger negative number from a smaller positive number exhibited. Under these circumstances the shutter interponent 116 will be in the position shown in Fig. 9; inasmuch as the highest computing wheel 87 has stopped at "9", the computing wheel interponent 117 will also be in the position shown in Fig. 9 in alinement with the interponent 116; and inasmuch as a subtracting operation is going on the state-controlling interponent 118 will likewise be held in the position shown in Fig. 9 by the latch 131. We therefore have the three interponents in alinement with each other, so that after the first tens-carrying operation has been completed, giving the computing wheels a chance to carry tens if they could, then the camming dog 136 comes into play just a little after the one-half way point of the return stroke of the general operator 43. The shaft 143 will be rocked, the blade 144 swung to the right thrusting before it the alined interponents 116, 117 and 118, which in turn swing to the right the blade 148 so as to thrust upwardly the pawl 151, which will advance the special mutilated gear 152 one-ninth of a revolution, whereby it will be caught by its assisting segment 52 and swung around the remaining two-ninths, or a third of a revolution in all.

Inasmuch as the shutter or shield 109 is in the position shown in Fig. 12, the dog 157 is swung forwardly above the point of the apex 159 so as to be diverted into contact with the shoulder 160, thereby swinging the shutter 109 from the position shown in Fig. 12 where it discloses black or positive digits, to the position shown in Fig. 13 where it discloses red or negative digits. The shutter will then indicate the following number:

0 0 0 0 0 0 0 0 3 7 the single underlining meaning that the digits are shown in red, denoting that we have now gone below zero in our computation and made an algebraic summation. It will be noted in this connection that we have obtained the true algebraic resultant, that is, the difference between +31 and —68 being —37.

It will be further noted that we have not boosted the units wheel an extra unit, and in fact, have refrained from so doing, which is customary in this type of machine with a normal complementary subtracting operation. The mechanism has taken care of this automatically because the highest idle computing wheel 87 has not traveled ten points or a complete revolution, but it has remained with its "9" point (black) at the line of sight.

The next number in the sum is —25. The machine is again set for subtraction and the "2" key struck in the tens column and the "5" key struck in the units column. All the computing wheels of higher denomination than tens will be rotated nine-tenths of a revolution, while the tens computing wheel will be rotated seven points and the units computing wheel four points. Inasmuch as the highest computing wheel 87 has passed at this time from "9" to "0", the latch 85 for the kicking in or boosting in mechanism will be tripped, but the same can only operate very slightly to clear the latch 85 as the bar 77 is still held in the path of the arm 79 by the latch 183. When, however, the general operator completes its forward movement, the cross bar 185 thereon will engage the bell crank arm 186 and release the latch 183, thereby permitting the inserting or boosting in mechanism to operate so as to advance the units computing wheel one step. This takes place at the very end of the forward movement of the general operator so that all the rack bars will have finished their forward movement as this kicking in mechanism operates, thereby preventing the extra unit added to the units wheel from being lost or piling onto the normal rotation thereof by its rack bar 20.

Inasmuch as the computing wheels registered before, 37 in red figures, this corresponds to the same position of the computing wheels for 62 in positive black figures, so that having rotated the computing wheels seven and five points respectively, it will be seen that the tens computing wheel has passed through zero in completing a revolution, whereby tens will be carried to the hundreds computing wheel.

Inasmuch as all the higher computing wheels than tens stood at positions corresponding to a series of black "9"s at the sight opening or a series of red "0"s visible, and they have been rotated nine-tenths of a revolution, all above the hundreds computing wheel will have had "1" carried thereto so that they will stand at a position corresponding to the black "9"s or red "0"s. The hundreds computing wheel having had "1" carried thereto by the tens computing wheel, will pass from a position corresponding to black "8" or red "1" to a position corresponding to black "9" or red "0".

Inasmuch as the shutter is in a position corresponding to the showing of red, the series of red digits will be exhibited, with red "6" and red "2" in the tens and units computing wheels, respectively. The register will then show:

0000000062 meaning that the resultant is now a debit or negative quantity of 62.

Inasmuch as the highest computing wheel 87 has stopped at a point corresponding to black "9" or red "0" at the sight opening, leaving the computing wheel interponent 118 in its intermediate position, while the shutter interponent is in its forward position, these two interponents will be out of alinement with each other so that an impulse cannot be transmitted through the three interponents, whereby the shutter will remain unshifted, still in its red showing position.

The next number to be computed is +45. The machine, as previously explained, has in the meantime returned to an adding state after an operation of the general operator, so that "4" and "5" as the keys are struck, are set up according to the direct value in the tens and units rack bars 20, respectively. The "9" pins are not set up for the higher rack bars 20 than the tens rack bar as was the case in subtraction, nor has the "9" pin 91 been set up for the special bar 90. At an operation of the general operator then the tens computing wheel which stands at an exhibition of red "6" corresponding to black "3", will be rotated four points, bringing the same to a black "7" position or a red "2". The units computing wheel stood at red "2" or correspondingly black "7" and will be rotated five points, bringing the same to black "2" or red "7". This shows that "1" has been carried from the units wheel in passing through zero to the tens wheel so that the latter will pass to black "8" or correspondingly red "1", giving the algebraic sum as red 17, the algebraic sum of —62 and +45.

It will be seen that inasmuch as all the computing wheels higher than the tens computing wheel have been left undisturbed, the highest computing wheel 87 will still remain at a position corresponding to black "9" or red "0", so that the inserting or boosting in mechanism for the units computing wheel will not be operated in this algebraic addition of a smaller positive number to a larger negative number exhibited. This denotes that we have not as yet passed up through zero, so there was no need of inserting the extra unit into the units wheel in an adding operation. The interponents are also not in common alinement so that the shutter-shifting mechanism is not brought into play.

The next number to be computed is +65.

The machine is still in its adding condition. The tens computing wheel which stands at red "1" corresponding to black "8" will be rotated six points so that it will pass through zero to a position corresponding to black "4" or red "5". The units computing wheel which stands at red "7" corresponding to black "2" will be rotated five points, so that it will stand at a position corresponding to black "7" or red "2".

Now inasmuch as "1" has been carried from the tens computing wheel to the hundreds computing wheel, this computing wheel which stands at red "0" corresponding to black "9", will pass to a position corresponding to black "0" or red "9", so that "1" will be carried to the thousands computing wheel, which will likewise pass from a red "0" or correspondingly black "9" position, to a black "0" or red "9" position, so that "1" will be carried therefrom to the tens of thousands computing wheel, and so on up the whole line, until the highest idle computing wheel 87 is moved from a position corresponding to red "0" or black "9" at the line of sight, to black "0" or red "9" at the line of sight. This will give in red:

9999999952

This will bring into operation the special tens-carrying tooth 92 which will operate the trip 93 to trip the latch 85.

Inasmuch as the tens-carrying operation took place during the first half of the return stroke of the general operator, the units computing wheel will receive a boost of one unit as the bar 77 has passed away from the arm 79, so that it will now be at the black "8" position or correspondingly red "1", giving:

9999999951

The computing wheel interponent 117 has passed to its "0" position shown in Fig. 11; the state-controlling interponent 118 is in its forward or adding position in alinement with the interponent 117; and the shutter interponent 116 is in its forward position corresponding to the exhibition of red digits, as indicated at R in Fig. 20. The three interponents 116, 117 and 118 will then be in alinement with each other, as indicated by the three lower positions in Fig. 20, R, O, and Adding.

Now then, as the general operator 43 arrives half way home on its return stroke, the dog 136 (Fig 9) will engage and swing the arm 142 to rock the shaft 143, so that the blade 144 will strike the interponent 116 which will transmit, through alined interponents 117 and 118, an impulse to the blade 148 so that the latter will swing the arm 150 to thrust upwardly the pawl 151. This pawl 151 will advance the special mutilated gear 152 one-ninth of a revolution, bringing the same to a position such that one of its complete teeth will lie in the path of movement of the associated assisting segment 52, enabling the latter to rotate this mutilated gear the remaining two-ninths of a revoluion, or one-third of a revolution in all. This will sweep the trident gear 153 through one-third of a revolution, causing it to swing the arm 155 against the tension of its spring 156 forwardly.

Inasmuch as the shutter or shield 109 is in its forward or red showing position, the dog 157 will engage below the point of the apex 159 and be diverted into engagement with the shoulder 161, swinging the shutter or shield 109 from the Fig. 13 position where it exhibits red, through the Fig. 14 position, to the Fig. 12 position where it will exhibit black.

We then have in place of the series of red "9"s and the red 51 at the sight opening, a series of black "0"s and the complementary digits of "5" and "1" or "4" and "8", so that at the sight opening there will now be

0000000048 as the algebraic sum of —17 and +65.

In other words +48 is the algebraic sum of all the numbers given, which takes in all possible variations in algebraic summations above and below zero.

Variations may be resorted to within the scope of the invention, and portions of the improvements may be used without others.

Having thus described my invention, I claim:

1. The combination with a series of computing wheels, each having a plurality of sets of digits, of an indicating mechanism for designating one set of digits at a time, a member connected to said indicating mechanism having an apex with a pair of shoulders on opposite sides thereof, a dog divertible by said apex into engagement with one or the other of said shoulders, an arm carrying said dog, and means for operating said arm whereby said indicating mechanism will be swung from designating one set of digits to designating another set of digits.

2. The combination with a series of computing wheels, each having a plurality of sets of digits thereon, of indicating mechanism for designating which of said sets of digits shall be read, a member connected to said indicating mechanism having an apex with shoulders on opposite sides thereof, a dog divertible by said apex into engagement with either one of said shoulders, an arm carrying said dog, a cam on said arm, and a camming gear engaging said cam to operate said arm, whereby said indicating mechanism may be shifted by said dog to designate a different set of said digits than was previously designated.

3. The combination with a series of computing wheels, each having a plurality of sets of digits thereon, of an indicating mechanism for designating which set of said digits shall be read, a member connected to said indicating mechanism having an apex with shoulders on opposite sides of said apex at the root thereof, a dog divertible by said apex to engagement alternatively with one or the other of said shoulders, an arm carrying said dog, means for maintaining said dog normally in an intermediate position, and means for operating said arm so that said apex may divert, according to its own position and the position of said indicating mechanism, said dog into engagement with one of said shoulders and swing said indicating mechanism by a further movement of said dog to another position pointing out a different set of said digits.

4. The combination with a series of computing wheels, each having a plurality of sets of digits thereon, of indicating mechanism for pointing out which of said sets of digits is to be read, a double-acting dog for shifting said indicating mechanism alternatively in opposite directions, an arm carrying said dog, and camming means for operating said arm.

5. The combination with a series of computing wheels, each having a plurality of sets of digits thereon, of indicating mechanism shiftable to indicate one or another of said sets of digits, and shifting mechanism for said indicating mechanism including a double-acting pawl, camming means for operating said pawl, and assisting means for operating said camming means.

6. The combination with a series of computing wheels, each having a plurality of sets of digits thereon, of driving means for said wheels, an indicating device for designating which of said sets of digits shall be read, tens-carrying mechanism for said computing wheels, a drive for said tens-carrying mechanism separate from the computing drive, shifting mechanism for said indicating mechanism, and means for enabling said tens-carrying mechanism drive to operate said shifting mechanism in a manner selectively determined by said indicating device.

7. The combination with a series of computing wheels, each having two sets of digits thereon, of a shutter for disclosing one of said sets of digits at a time, arms for supporting said shutter, an apex on one of said arms having shoulders at the root thereof, a dog normally occupying a neutral position and movable according to the position of said shutter above or below the pivotal axis thereof, and means for operating said dog so as to swing said shutter when in one of its two positions indicating one set of digits, to the other of its two positions indicating the other of said sets of digits.

8. The combination with a series of computing wheels having a plurality of sets of digits, of an indicating mechanism for pointing out one of said sets of digits to be read, shifting mechanism for adjusting said indicating mechanism to point out another set of digits to be read, tens-carrying mechanism for said computing wheels, assisting mechanism for said tens-carrying mechanism, and means to enable said assisting mechanism to operate said shifting mechanism.

9. The combination with a series of computing wheels, having digits thereon, of indicating mechanism for pointing out what digits are to be read, said indicating mechanism being pivotally mounted to swing about an axis to move from pointing out certain digits to pointing out certain other digits, and means engaging said indicating mechanism alternatively on opposite sides of the pivotal axis thereof according to the position of said indicating mechanism, to shift said indicating mechanism to just the opposite position.

10. The combination with a series of number wheels adapted to be rotated, of bars for so rotating them, settable devices for determining how far each wheel shall be rotated, keys for setting said devices, means adapted to cause said keys when actuated to automatically set said devices to effect either addition or subtraction on said wheels, means whereby each bar always drives its wheel in the same direction whether adding or subtracting, digits on said wheels adapted to indicate the numbers registered on said wheels both negatively and positively, and means whereby said digits are selectively caused to indicate a positive or a negative quantity by a direct reading.

11. The combination with a series of number wheels adapted to be rotated, of bars for so rotating them, settable devices for determining how far each wheel shall be rotated, keys for setting said devices, means adapted to cause said keys when actuated to automatically set said devices to effect either addition or subtraction on said wheels thereby, means whereby each bar always drives its wheel in the same direction whether adding or subtracting, digits on said wheels adapted to indicate the numbers registered on said wheels both negatively and positively, means whereby said digits are selectively caused to indicate a positive or a negative quantity by a direct reading, carry-over mechanism for said wheels, a general operator for driving said bars by said devices, and means whereby said general operator drives said carry-over mechanism after every bar has been completely driven.

12. The combination with a series of number wheels, each bearing a plurality of sets of digits, of a shutter shifting to disclose solely one set of said digits at a time, and shifting mechanism for said shutter controlled from said shutter.

13. The combination with a series of number wheels having a plurality of sets of digits, of indicating mechanism for designating but one of said sets of digits at a time, and shifting mechanism for said indicating mechanism, said indicating mechanism controlling when and how it itself shall be adjusted by said shifting mechanism.

14. The combination with a series of computing wheels, each having a plurality of sets of digits thereon, of indicating mechanism shiftable to indicate one set of digits at a time, and shifting mechanism for said indicating mechanism controlled from one of said computing wheels when such computing wheel stops its rotation at a point corresponding to "9" at the line of sight.

15. The combination with a series of computing wheels, each having a plurality of sets of digits thereon, of indicating mechanism for designating which set of digits is in use, shifting mechanism for said indicating mechanism, state-controlling mechanism for determining the character of computation carried on by said computing wheels, and mechanism controlled collectively by said indicating mechanism, by one of said computing wheels, and by said state-controlling mechanism to determine the action of said shifting mechanism.

16. The combination with a series of number wheels, each having a plurality of sets of digits thereon, of indicating mechanism for designating which set of digits is in use, actuating mechanism for said number wheels, a general operator for actuating said number wheels, and shifting mechanism for said indicating mechanism controlled from said general operator.

17. The combination with a series of number wheels, each having a plurality of sets of digits thereon, of indicating mechanism for designating which set of digits is in use, shifting mechanism for adjusting said indicating mechanism from one position of designation to another, state-controlling mechanism for governing the character of computation carried on by said number wheels, and means for enabling said state-controlling mechanism to control the actuation of said shifting mechanism.

18. The combination with a series of computing wheels, of actuating mechanism for said computing wheels arranged to run up numbers in said computing wheels either for addition or subtraction, boosting mechanism for advancing the units computing wheel an additional step when making a normal subtraction, and means for restraining said boosting mechanism from advancing said units wheel when making an algebraic subtraction.

19. The combination with a plurality of computing wheels, of indicating mechanism for pointing out one or the other of two sets of digits to be read on said computing wheels, and double-acting shifting mechanism operating by an identical stroke to shift said indicating mechanism in one direction or the other, said indicating mechanism determining by its previous location the direction in which it will be shifted.

20. The combination with a plurality of computing wheels, of an indicator shiftable for selectively pointing out the digits to be read on said computing wheels, shifting means for adjusting said indicator, and a member connected to said indicator having a selecting action to determine the direction of movement of said indicator by said shifting means.

21. The combination with a series of computing wheels having two sets of digits, of a shutter for indicating one or the other of said sets of digits to be read, an arm swingable to and fro, means for operating said arm, a dog pivotally mounted on said arm, a spring normally holding said dog in an intermediate position, and selecting means on said shutter arranged to swing said dog up or down so as to act at different points on said shutter to move said shutter either back or forth according to the action of said selecting means.

22. The combination with a series of computing wheels, of actuating mechanism for said computing wheels, complementary subtraction mechanism for said actuating mechanism, and mechanism arranged to boost the units wheel an added step at normal subtracting operations and refrain from boosting the units wheel an added step at certain other subtracting operations.

23. The combination with a series of computing wheels, of actuating mechanism for said computing wheels arranged to effect either adding or subtracting computations, indicating mechanism for pointing out digits on said computing wheels to be read, and shifting means operating to throw said indicating mechanism to the opposite limit of its movement from indicating one set of digits to be read, to indicating another set of digits to be read, when the computing wheel of highest denomination falls short of making a complete revolution while making a subtracting computation.

24. The combination with a series of number wheels, of bars for driving said wheels, devices settable on said bars for determining how far each bar shall drive its wheel, numeral keys, connections whereby said numeral keys set said devices to automatically effect addition or subtraction on said wheels, connections whereby each wheel is always driven in the same direction by its bar, a plurality of sets of digits on said wheels, a shutter shiftable to selectively disclose one set of digits at a time, and means whereby said shutter selectively causes its own shifting.

25. An algebraic computing mechanism comprising number wheels always rotating in the same direction to effect either adding or subtracting operations, actuating mechanism for the number wheels, automatic indicating mechanism acting spontaneously to point out the true resultant of an algebraic summation in going either down through zero from positive to negative numbers or up through zero from negative to positive numbers, and boosting mechanism for advancing the units wheel an added step in an algebraic summation solely when going up through zero from negative to positive numbers.

26. An algebraic computing mechanism comprising a series of number wheels, actuating mechanism for said number wheels, said actuating mechanism driving said number wheels always in the same direction for both addition and subtraction, automatic indicating mechanism acting spontaneously to show the true resultant of an algebraic summation, and actuating means for boosting the units wheel an added step when making an algebraic summation solely in adding a larger positive number to a small negative number exhibited by the number wheels.

27. An algebraic computing mechanism comprising a series of number wheels, actuating mechanism for said number wheels, said actuating mechanism driving said number wheels always in the same direction for both addition and subtraction, automatic indicating mechanism acting spontaneously to show the true resultant of an algebraic summation, and actuating means for boosting the units wheel an added step when making an algebraic summation solely in adding a larger positive number to a smaller negative number exhibited by the number wheels, said actuating means refraining from boosting said units wheel when making an algebraic subtraction of a larger negative number from a smaller positive number exhibited by said number wheels.

28. The combination with a series of number wheels having a plurality of sets of digits, of indicating mechanism for pointing out which set of digits is to be read, shifting mechanism for said indicating mechanism arranged to adjust the same from reading one set of digits to reading another set of digits, starting mechanism for said indicating mechanism, state-controlling mechanism for determining the character of computation registered by said number wheels, and a plurality of interponents controlled respectively by said indicating mechanism, one of said number wheels and said state-controlling mechanism, enabling the actuation of said starting mechanism when said indicating mechanism, said specially-mentioned number wheel, and said state-controlling mechanism exist under certain definite related conditions of a plurality of selective conditions.

29. An algebraic computing mechanism comprising a series of computing wheels having a plurality of different sets of digits, indicating mechanism for pointing out which set of said digits is to be read, and controlling mechanism for adjusting said indicating mechanism when a certain set of conditions obtains in said algebraic computing mechanism, said indicating mechanism itself selectively determining how the controlling mechanism shall adjust it.

30. An algebraic computing mechanism comprising a series of number wheels having two sets of digits, indicating mechanism for pointing out one or the other of said sets of digits to be read, and controlling mechanism operating to shift said indicating mechanism in one direction when one set of conditions exists, and operating to shift said indicating mechanism in the opposite direction when another set of conditions exists, said controlling mechanism including a plurality of members movable to different positions for different conditions of several parts of said computing mechanism.

31. An algebraic computing mechanism comprising a series of computing wheels having a plurality of different sets of digits, indicating mechanism for pointing out which set of said digits is to be read, and controlling mechanism for adjusting said indicating mechanism when a certain set of conditions obtains in said algebraic computing mechanism, said controlling mechanism including a plurality of members movable to different positions for different conditions of several parts of said computing mechanism.

32. An algebraic computing mechanism comprising a series of number wheels having a plurality of sets of digits, indicating mechanism for pointing out which of said sets of digits is to be read, state-controlling mechanism for determining the character of computation registered in said number wheels, shifting mechanism for said indicating mechanism, a starter for said shifting mechanism, an interponent for said shifting mechanism, an interponent controlled by one of said number wheels, an interponent controlled by said state-controlling mechanism, and actuating means for operating said starter through said interponents when said interponents are in alinement with each other.

33. The combination with a series of number wheels having a plurality of sets of digits, of indicating mechanism pointing out which set of digits is to be read, driving means for said number wheels, a general operator for actuating said driving mechanism, shifting mechanism for said indicating mechanism, means operated from said general operator for bringing said last-mentioned means in play, and intervening mechanism between said last-mentioned means and said shifting mechanism normally ineffective and acting effectively when certain series of conditions in connection with said number wheels and said indicating mechanism obtain.

34. An algebraic computing mechanism comprising a plurality of number wheels having a plurality of sets of digits selectively in use, indicating mechanism for pointing out which set of digits is in use, subtraction-setting mechanism for enabling said number wheels to register subtracting computations, an interponent adjustable to correspond with the positions of said indicating mechanism, an interponent adjustable to correspond with positions of one of said number wheels, an interponent adjustable to correspond with the character of computation being registered in said number wheels, and shifting means controlled from said interponent for adjusting said indicating mechanism from one position to another.

35. The combination with a series of number wheels having a plurality of sets of digits, of indicating mechanism shiftable to point out one or another of said sets of digits, state-controlling mechanism for determining the character of computation run up on said number wheels, shifting mechanism for adjusting said indicating mechanism to different positions corresponding to the pointing out of different sets of digits, said shifting mechanism including an interponent adjusted from said state-controlling mechanism to different positions corresponding to different states or characters of computation, a part of said state-controlling mechanism operating to shift said interponent, acting temporarily and returning before the computation controlled thereby has been completed, and latching mechanism for locking said interponent in the position corresponding to the state determined by said state-controlling mechanism until the computation corresponding thereto has been completed.

36. The combination with a series of number wheels, of indicating mechanism for pointing out the numbers to be read on said number wheels, a series of gearing groups arranged in juxtaposition to said number wheels, some of said groups effecting carry-over operations between adjacent number wheels, one of said groups acting to shift said indicating mechanism, and starting mechanism for said last-mentioned group.

37. The combination with a series of number wheels, of indicating mechanism for pointing out the numbers to be read on said number wheels, a series of gearing groups arranged in juxtaposition to said number wheels, some of said groups effecting carry-over operations between adjacent number wheels, one of said groups acting to shift said indicating mechanism, starting mechanism for said last-mentioned group, and means for enabling control of said starting mechanism from one of said number wheels.

38. The combination with a series of number wheels having two sets of numbers, of indicating mechanism for pointing out the numbers to be read on said number wheels, controlling mechanism for said indicating mechanism including a part adjustable to different positions corresponding to different types of computation being run up into said number wheels, state-controlling mechanism connected to shift said specially mentioned part, and a latch for holding said part for a time in an adjusted position.

39. The combination with a series of number wheels having two sets of numbers, of indicating mechanism for pointing out the numbers to be read on said number wheels, controlling mechanism for said indicating mechanism including a part adjustable to different positions corresponding to different types of computation being run up into said number wheels, state-controlling mechanism connected to shift said specially mentioned part, a latch for holding said part for a time in an adjusted position, and automatic means for spontaneously releasing said latch at a definite point in a computation.

40. The combination with a series of number wheels, of indicating mechanism for pointing out the numbers to be read on said number wheels, shifting mechanism for said indicating mechanism, tens-carrying mechanism for said number wheels, and an assisting mechanism including a series of segments for operating said tens-carrying mechanism and a segment for operating said shifting mechanism.

41. The combination with a series of number wheels, of boosting mechanism normally under tension tending to drive the units number wheel, a lock for said boosting mechanism, and tripping means actuated from the highest number wheel for releasing said lock.

42. The combination with a series of number wheels, of boosting mechanism for the units number wheel, a lock for said boosting mechanism, tripping means actuated from the highest number wheel for releasing said lock, and obstructing means for preventing the actuation of said boosting mechanism after the releasing of said lock.

43. The combination with a series of number wheels, of driving means for said number wheels, a general operator for actuating said driving means, boosting mechanism for advancing the units wheel an added step, means for setting said boosting mechanism from said general operator, a lock for said boosting mechanism, and tripping means operated from the highest number wheel for releasing said lock.

44. The combination with a series of number wheels, of boosting-in mechanism for advancing the units number wheel an added step, a latch for said boosting-in mechanism, a shaft for said latch, a link connected to rock said shaft, a trip connected to operate said link, and a special tooth on the number wheel of highest denomination arranged to operate said trip.

45. The combination with a series of number wheels, of boosting-in mechanism for advancing the units number wheel an added step, a latch for said boosting-in mechanism, a shaft for said latch, a link connected to rock said shaft, a trip connected to operate said link, a special tooth on the number wheel of highest denomination arranged to operate said trip, and driving means for actuating said highest number wheel solely during a subtracting operation.

46. The combination with a series of number wheels, of a boosting-in mechanism for one of said number wheels, a general operator for driving said number wheels, and setting mechanism for said boosting mechanism acting during the initial portion of the forward stroke of said general operator.

47. The combination with a series of number wheels, of a boosting-in mechanism for one of said number wheels, a general operator for driving said number wheels, setting mechanism for said boosting mechanism acting during the initial portion of the forward stroke of said general operator, and locking mechanism for maintaining said setting mechanism in its operated position.

48. The combination with a series of number wheels, of a boosting-in mechanism for one of said number wheels, a general operator for driving said number wheels, setting mechanism for said boosting mechanism acting during the initial portion of the forward stroke of said general operator, locking mechanism for maintaining said setting mechanism in its operated position, and releasing means for said locking means operated from said general operator.

49. The combination with a series of number wheels, of a boosting-in mechanism for advancing one of said number wheels an additional step, a general operator having a back-and-forth stroke arranged to drive said number wheels during the forward stroke thereof, and restraining means controlled from said general operator for preventing an action of said boosting-in mechanism during the forward stroke of said general operator, said restraining means adapted to be released during the back stroke of the operator.

50. The combination with a series of number wheels, of driving mechanism for said number wheels, supplementary boosting-in mechanism normally tending to advance one of said number wheels an added step, and restraining means for preventing the action of said boosting-in mechanism during the rotation of said number wheels by said driving mechanism.

51. The combination with a series of number wheels, of a boosting-in mechanism for advancing one of said number wheels an added step, a bar for setting said boosting-in mechanism, a general operator, and a dog on said bar temporarily engaging said general operator to enable the advancement of said bar.

52. The combination with a series of number wheels, of a boosting-in mechanism for advancing one of said number wheels an added step, a bar for setting said boosting-in mechanism, a general operator, a dog on said bar temporarily engaging said general operator to enable the advancement of said bar, and a latch for holding said bar in its actuated position.

53. The combination with a series of number wheels, of a boosting-in mechanism for advancing one of said number wheels an added step, a bar for setting said boosting-in mechanism, a general operator, a dog on said bar temporarily engaging said general operator to enable the advancement of said bar, a latch for holding said bar in its actuated position, and releasing means operated from said general operator for releasing said latch to permit the return of said bar to a position entirely clear of said boosting-in mechanism.

54. The combination with a series of number wheels, of a boosting-in mechanism under tension tending to advance the units number wheel an added step, a lock for said boosting-in mechanism, a trip for said lock, means for operating said strip, and means for delaying the action of said boosting-in mechanism after being tripped until the units wheel is passive.

55. The combination with a series of number wheels including an idle number wheel of highest denomination, of driving mechanism for said number wheels including a driving member arranged to drive the idle number wheel of highest denomination nine-tenths of a revolution for every subtracting operation, and boosting-in mechanism for the units number wheel controlled from said highest number wheel.

56. The combination with a series of number wheels arranged to always rotate in the same direction for both addition and subtraction, of complementary subtraction mechanism having driving means for rotating said number wheels always in the same direction for addition and subtraction, and boosting-in mechanism for advancing the units wheel an added step always in the same direction, controlled from the number wheel of highest denomination.

57. The combination with a series of number wheels always rotating in the same direction, of carry-over trains extending from the number wheel of lowest denomination to the number wheel of highest denomination always acting to carry in the same direction, and a carry-over train from the number wheel of highest denomination to the number wheel of lowest denomination acting to advance the units number wheel an added step always in the same direction.

58. The combination with a series of number wheels having a plurality of sets of digits, of indicating mechanism shiftable to point out one or the other of said sets of digits to be read, boosting-in mechanism for advancing the units wheel an added step, and actuating means concomitantly enabling an operation of said boosting-in mechanism in an algebraic summation with the shifting of said indicating mechanism solely when adding.

59. The combination with a series of number wheels, of driving means for rotating said number wheels solely in one direction, indicating mechanism for designating which numbers are to be read on said number wheels, boosting-in mechanism for advancing the units number wheel an added step, means for shifting said indicating mechanism, means for bringing said boosting-in mechanism in play, and connections enabling the concomitant action of both said last-mentioned means solely in an algebraic summation coming up through zero from computing in negative amounts below zero to computing in positive amounts above zero.

60. The combination with a register having a plurality of number wheels, of keys for determining how far said wheels shall turn, computing mechanism between said keys and wheels for effecting adding and subtracting operations by a complementary action, and automatic mechanism effective on said wheels in passing to and from registering negative totals, for enabling said register selectively to be operated by said computing mechanism to give the true resultant.

61. The combination with a register including a plurality of number wheels, of complementary subtracting and adding computing mechanism for rotating said number wheels to effect either subtracting or adding operations, automatic means for selectively advancing the units wheel an added step when shifting to or from negative totals, and automatically shifting indicating mechanism for pointing out one or another set of numbers on said number wheels to be read so as to give the true resultant.

62. The combination with an algebraic register including a plurality of number wheels, of driving means for said number wheels adapted to automatically rotate said number wheels amounts corresponding to the values of the digits to be computed when adding, and amounts corresponding to complete rotations less the values of the digits to be computed when subtracting, automatic means controlled from said register for selectively driving said wheels to register the true resultant of algebraic summations including subtracting of a larger number from a smaller number, and adding of a larger positive number to a smaller negative number, and means also controlled from said register for selectively indicating where the true result is to be read.

63. The combination with an algebraic register having its number wheels rotated always in the same direction for both adding and subtracting computations, of complementary computing mechanism for driving said number wheels always in the same direction amounts varying with respect to the digits to be computed according to whether the computation is an adding or a subtracting one, and automatic mechanism enabling said register and said computing mechanism to coöperate to effect an algebraic addition or an algebraic subtraction while rotating said number wheels always in the same direction.

64. The combination with a plurality of computing wheels, each having two sets of digits thereon, of shiftable indicating mechanism indicating one set of digits to be read, a certain one of said computing wheels, in an arithmetical subtracting operation normally completing a revolution, and shifting mechanism acting in an algebraic summation passing through zero, when said certain wheel fails to complete a revolution to change the position of said indicating mechanism, so as to point out the other set of digits.

65. The combination with a series of computing wheels having two sets of digits enabling computations both above and below zero, a certain one of said computing wheels being normally silenced when adding, of means for rotating said certain computing wheel when adding a larger positive number to a smaller negative number already exhibited by said computing wheels.

66. The combination with algebraic computing wheels having two sets of digits to enable computations both above and below zero, said computing wheels always rotating in one direction for both addition and subtraction, of driving means for rotating said computing wheels solely in one direction, and automatic indicating mechanism controlled in part from said computing wheels and in part from said driving means, acting to point out one or the other set of said digits, to give the true resultant of an algebraic summation, either in passing down through zero or up through zero.

67. The combination with a series of algebraic computing wheels having two sets of digits, one set indicating positive items above zero, and the other set indicating negative items below zero, of driving means for rotating said computing wheels always in the one direction for both addition and subtraction, indicating mechanism for pointing out one or the other of said sets of digits according as to whether the resultant is positive or negative, and justifying mechanism for giving the true resultant in passing through zero, acting to shift said indicating mechanism and to add a unit to the computing wheel of lowest denomination, said justifying mechanism depending for its action on the position of said indicating mechanism, the position of one of said computing wheels, and the character of computation being carried on.

68. In a calculating machine, the combination of a totalizer including a set of wheels, carrying mechanism connected to said wheels and adapted to advance said wheels in one direction only, a set of complementary numerals on said wheels, and a shiftable index governed by the highest wheel of said totalizer to designate which set of numerals is to be read.

69. In a calculating machine, the combination of a totalizer including a set of wheels, a carrying mechanism connected to said wheels and adapted to advance said wheels in one direction only, means to insert a unit in the lowest place of said totalizer, a shiftable index associated with said numeral wheels, and means to simultaneously shift said index and determine that a number shall be inserted in the lowest place of said totalizer.

70. In a calculating machine, the combination of a totalizer having wheels, a set of complementary numbers on said wheels, a shiftable index to designate which set of numbers shall be read, carrying mechanism carrying said wheels and adapted to advance said wheels in one direction only, and means governed by the totalizer wheel of highest order to advance the totalizer wheel of lowest order and shift said index in order to designate the set of numbers to be read.

71. In a calculating machine, the combination of means for setting up a number, means for setting up the complement of said number, a set of racks, a set of totalizer gears adapted to be actuated by said racks, a set of figure wheels having complementary sets of figures, means for moving the figure wheel in the units position one step whenever the wheel in the highest position crosses the carrying point.

72. In a calculating machine, the combination of means for setting up a number, means for setting up the complement of a number, a set of keys operated on both of said setting up means, a set of racks whose motion is determined by the position of said setting up means, a set of totalizer wheels adapted to be actuated by said racks, and means for moving the totalizer wheel in the lowest decimal denomination, said means being controlled by the highest totalizer wheel.

73. In a calculating machine, means for setting up a number, means for setting up the complement of a number, a set of keys, means to connect said keys either to the number set up means or to the complement set up means, a set of racks whose motion is determined by said setting up means, a set of totalizer gears adapted to be actuated by said racks, and means for moving the totalizer gear in the lowest denomination one step whenever the totalizer gear in the highest decimal denomination passes its carrying point.

74. In a calculating machine, means for setting up a number, means for setting up the complement of said number, a set of keys, means to connect said keys either to the number set up means or to the complement set up means, a set of racks whose motion is determined by said setting up means, a set of totalizer gears adapted to be actuated by said racks, a set of figure wheels having complementary sets of figures thereon, and means for advancing the figure wheel in the units position one step whenever the totalizer gear in the highest position passes the carrying point.

HORATIO WHITING.

Witnesses:
W. O. WESTPHAL,
JULIUS DUCKSTINE.